(12) United States Patent
Chen

(10) Patent No.: US 11,403,763 B2
(45) Date of Patent: Aug. 2, 2022

(54) IMAGE SEGMENTATION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Sihong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 72 days.

(21) Appl. No.: 17/039,925

(22) Filed: Sep. 30, 2020

(65) Prior Publication Data

US 2021/0019890 A1   Jan. 21, 2021

Related U.S. Application Data

(63) Continuation of application No. PCT/CN2019/110557, filed on Oct. 11, 2019.

(30) Foreign Application Priority Data

Oct. 16, 2018 (CN) .......................... 201811204371.6

(51) Int. Cl.
*G06T 7/11* (2017.01)
*G06T 7/00* (2017.01)
*G06T 7/174* (2017.01)

(52) U.S. Cl.
CPC .............. *G06T 7/11* (2017.01); *G06T 7/0012* (2013.01); *G06T 7/174* (2017.01);
(Continued)

(58) Field of Classification Search
CPC ......... G06T 7/11; G06T 7/174; G06T 7/0012; G06T 2207/20081; G06T 2207/20132; G06T 2207/30004

See application file for complete search history.

(56) References Cited

U.S. PATENT DOCUMENTS

| 10,878,219 B2 | 12/2020 | Zhou | |
| 2008/0292169 A1* | 11/2008 | Wang | G06T 7/174 382/131 |

(Continued)

FOREIGN PATENT DOCUMENTS

| CN | 102360494 A | 2/2012 |
| CN | 105574859 A | 5/2016 |

(Continued)

OTHER PUBLICATIONS

The World Intellectual Property Organization (WIPO) International Search Report for PCT/CN2019/110557 dated Jan. 21, 2020 5 Pages (including translation).

(Continued)

*Primary Examiner* — Bobbak Safaipour
*Assistant Examiner* — Duy Tran
(74) *Attorney, Agent, or Firm* — Anova Law Group, PLLC

(57) ABSTRACT

An image segmentation method is provided for a computer device. The method includes obtaining a plurality of sample images, calling an initial model to input the plurality of sample images into the initial model and to train the initial model based on the plurality of sample images to obtain an image segmentation model and, based on the initial model, determining a number of image segmentation modules according to a number of types of pixels of the plurality of sample images. Different image segmentation modules are used for segmenting different regions of an image. The method also includes calling the image segmentation model in response to obtaining a first image to be segmented, and segmenting the first image by using the image segmentation model based on a plurality of image segmentation modules, to output a second image. Computer device and non-tran- (Continued)

sitory computer-readable storage medium counterparts are also contemplated.

20 Claims, 9 Drawing Sheets

(52) U.S. Cl.
CPC ............... *G06T 2207/20081* (2013.01); *G06T 2207/20132* (2013.01); *G06T 2207/30004* (2013.01)

(56) References Cited

U.S. PATENT DOCUMENTS

| | | | |
|---|---|---|---|
| 2010/0266175 | A1* | 10/2010 | Seung .................. G06T 7/12 382/128 |
| 2014/0185891 | A1* | 7/2014 | Schoenmeyer ....... G06T 11/206 382/128 |
| 2016/0005183 | A1* | 1/2016 | Thiagarajan .......... G06T 7/0012 382/131 |
| 2017/0169567 | A1* | 6/2017 | Chefd'Hotel ........ G06N 3/0454 |
| 2018/0061059 | A1 | 3/2018 | Xu et al. |
| 2018/0122072 | A1 | 5/2018 | Abedini et al. |
| 2018/0189949 | A1 | 7/2018 | Lapiere et al. |
| 2018/0240235 | A1* | 8/2018 | Mazo ..................... G06N 3/04 |
| 2018/0259608 | A1 | 9/2018 | Golden et al. |

FOREIGN PATENT DOCUMENTS

| | | |
|---|---|---|
| CN | 106226050 A | 12/2016 |
| CN | 107240102 A | 10/2017 |
| CN | 107506761 A | 12/2017 |
| CN | 107507201 A | 12/2017 |
| CN | 107742122 A | 2/2018 |
| CN | 108492297 A | 9/2018 |
| CN | 108492301 A | 9/2018 |
| CN | 108603922 A | 9/2018 |
| CN | 109360210 A | 2/2019 |
| EP | 3373246 A1 | 9/2018 |
| WO | 2018015414 A1 | 1/2018 |

OTHER PUBLICATIONS

The State Intellectual Property Office of the People's Republic of China (SIPO) Office Action 1 for 201811204371.6 dated Jul. 19, 2019 15 Pages (including translation).

Feng Jiang et al.; "Survey on Content-Based Image Segmentation Methods," Journal of Software vol. 28 No. 1. Dec. 31, 2017 (Dec. 31, 2017), pp. 160-183. 24 pages.

Akshat Gotra et al.; "Liver segmentation: indications, techniques and future directions," Insights Imaging, Jun. 14, 2017 (Jun. 14, 2017), pp. 377-392. 16 pages.

Shaowei Ding; "Research on Osteosarcoma Medical Image Analysis System," Chinese Master's Theses Full-text Database: Information Science and Technology, vol. 06, 2014, Jun. 15, 2014 (Jun. 15, 2014). 76 pages.

Clement Dupont et al.; "On image segmentation methods applied to glioblastoma: state of art and new trends," RBM, Elsevier Masson vol. 37 No. 3, Dec. 31, 2016 (Dec. 31, 2016), pp. 131-143. 19 pages.

The European Patent Office (EPO) The Extended European Search Report for 19873499.8 dated Nov. 10, 2021 11 Pages.

Anonymous Researchgate et al., "What exactly is the label data set for semantic segmentation using FCN? Most recent answer," ResearchGate.net, Jul. 23, 2018 (Jul. 23, 2018), Retrieved from the Internet:URL: http://www.researchgate.net/post/What-exactly-is-the-label-data-set-for-semantic-segmentation-using-FCN [retrieved on Jun. 25, 2021], 7 pages.

Guotai Wang et al., "Automatic Brain Tumor Segmentation using Cascaded Anisotropic Convolutional Neural Networks," arxiv.org, arXiv:1709.00382v2, Dec. 15, 2017 (Dec. 15, 2017). 12 pages.

Holger R Roth et al., "An application of cascaded 3D fully convolutional networks for medical image segmentation," arxiv.org, arXiv:1803.05431v2, Mar. 20, 2018 (Mar. 20, 2018). 21 pages.

Jason Brownlee, "8 Tactics to Combat Imbalanced Classes in Your Machine Learning Dataset," Machine Learning Mastery, Jul. 12, 2018 (Jul. 12, 2018), Retrieved from the Internet:URL:https://web.archive.org/web/20180712141603/https://machinelearningmastery.com/tactics-to-combat-imbalanced-classes-in-your-machine-learning-dataset/, [retrieved on Jun. 29, 2021], 11 pages.

\* cited by examiner

IMAGE SEGMENTATION METHOD AND APPARATUS, COMPUTER DEVICE, AND STORAGE MEDIUM

RELATED APPLICATIONS

This application is a continuation application of PCT Patent Application No. PCT/CN2019/110557, filed on Oct. 11, 2019, which claims priority to Chinese Patent Application No. 201811204371.6, entitled "IMAGE SEGMENTATION METHOD AND APPARATUS, COMPUTER DEVICE, AND STORAGE MEDIUM" and filed with the National Intellectual Property Administration, PRC on Oct. 16, 2018, content of all of which is incorporated herein by reference in its entirety.

FIELD OF THE TECHNOLOGY

This application relates to the field of computer technologies and, in particular, to an image segmentation method and apparatus, a computer device, and a storage medium.

BACKGROUND

With the development of computer technologies, the image segmentation technology is increasingly widely applied, for example, medical image segmentation and natural image segmentation. The image segmentation technology is a technology that divides an image into several specific regions with unique properties and extracts an interested object. Human tissues generally have fixed range limitations and form distribution features, so that segmentation accuracy can be effectively improved by designing specific image segmentation models according to different tissue distribution situations. One distribution situation of human tissues is nested, that is, one tissue in a human body has another inner tissue. For example, a brain tumor is a nested tissue, and edema, non-enhanced tumor, and enhanced tumor are sequentially distributed from a nested outer layer to an inner layer.

Currently, as shown in FIG. 1, an image segmentation method generally adopts a cascaded anisotropic convolutional neural network (cascaded ACNN), and the network is used for segmenting a brain tumor. Because the three tissues need to be obtained by segmenting the brain tumor, the network includes three segmentation models of different types: a whole tumor network (WNET), a tumor network (TNET), and an enhancing tumor network (ENET). The three segmentation models are respectively used for performing different types of segmentation on an image, namely, respectively used for obtaining the three tissues through segmentation. According to the image segmentation method, after an image is inputted into the network, the WNET generally segments the complete image, to obtain an edema region of the image. An image of the edema region is inputted into the TNET, and the TNET segments the image of the edema region, to obtain a non-enhanced tumor region of the image. The non-enhanced tumor region is then inputted into the ENET, and the ENET segments the non-enhanced tumor region, to obtain an enhanced tumor region. The cascaded ACNN finally overlaps the regions obtained by the three models from small to large, to obtain a segmented image.

The cascaded ACNN is only applicable to segmentation on the brain tumor. If segmentation needs to be performed on other nested human tissue images, a technician needs to redesign the model based on distribution situations of the other nested human tissue images rather than directly performing training based on the network. Therefore, the generality, applicability, and practicability of the image segmentation method is often poor. The disclosed methods and systems are directed to solve one or more problems set forth above and other problems.

SUMMARY

Embodiments of the present disclosure provide an image segmentation method and apparatus, a computer device, and a storage medium.

According to one aspect of the present disclosure, an image segmentation method is provided for a computer device. The method includes obtaining a plurality of sample images, calling an initial model to input the plurality of sample images into the initial model and to train the initial model based on the plurality of sample images to obtain an image segmentation model and, based on the initial model, determining a number of image segmentation modules according to a number of types of pixels of the plurality of sample images. Different image segmentation modules are used for segmenting different regions of an image. The method also includes calling the image segmentation model in response to obtaining a first image to be segmented, and segmenting the first image by using the image segmentation model based on a plurality of image segmentation modules, to output a second image. The plurality of sample images and the first image all are target human tissue images.

According to another aspect of the present disclosure, a computer device is provided. The computer device includes a memory storing computer program instructions, and a processor coupled to the memory. When executing the computer program instructions, the processor is configured to perform: obtaining a plurality of sample images; calling an initial model to input the plurality of sample images into the initial model, and to train the initial model based on the plurality of sample images to obtain an image segmentation model; based on the initial model, determining a number of image segmentation modules according to a number of types of pixels of the plurality of sample images, wherein different image segmentation modules are used for segmenting different regions of an image; and calling the image segmentation model in response to obtaining a first image to be segmented, and segmenting the first image by using the image segmentation model based on a plurality of image segmentation modules, to output a second image, wherein the plurality of sample images and the first image all are target human tissue images.

According to another aspect of the present disclosure, a non-transitory computer-readable storage medium is provided. The non-transitory computer-readable storage medium stores computer program instructions executable by at least one processor to perform: obtaining a plurality of sample images; calling an initial model to input the plurality of sample images into the initial model, and to train the initial model based on the plurality of sample images to obtain an image segmentation model; based on the initial model, determining a number of image segmentation modules according to a number of types of pixels of the plurality of sample images, wherein different image segmentation modules are used for segmenting different regions of an image; and calling the image segmentation model in response to obtaining a first image to be segmented, and segmenting the first image by using the image segmentation model based on a plurality of image segmentation modules, to output a second image, wherein the plurality of sample images and the first image all are target human tissue images.

Details of one or more embodiments of the present disclosure are provided in the following accompany drawings and descriptions. Other features, objectives, and advantages of the present disclosure will become apparent from the specification, the accompanying drawings, and the claims.

BRIEF DESCRIPTION OF THE DRAWINGS

To describe the technical solutions of the embodiments of the present disclosure more clearly, the following briefly describes the accompanying drawings required for describing the embodiments. Apparently, the accompanying drawings in the following description show only some embodiments of the present disclosure, and a person of ordinary skill in the art may derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings. The specific embodiments described herein are merely used for explaining the present disclosure, but are not intended to limit the present disclosure. Other embodiments obtained by a person of ordinary skill in the art based on the embodiments of the present disclosure without creative efforts shall fall within the protection scope of the present disclosure.

Figure 1:
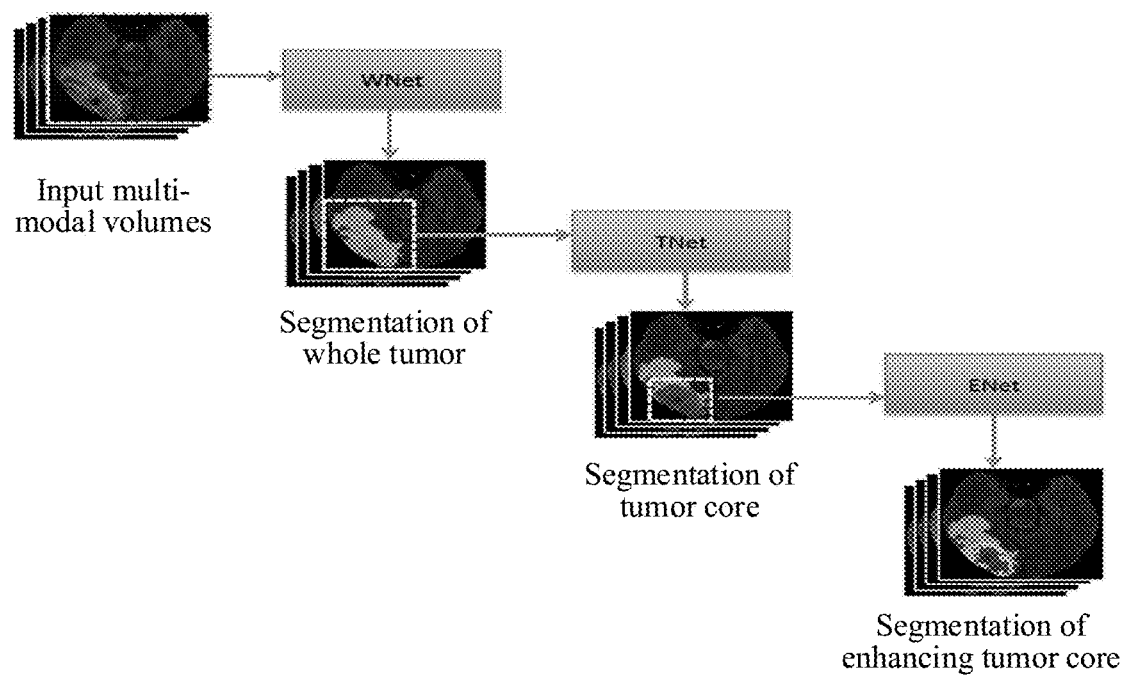
FIG. 1 is a schematic flowchart of segmentation of cascaded ACNN.
Figure 2:
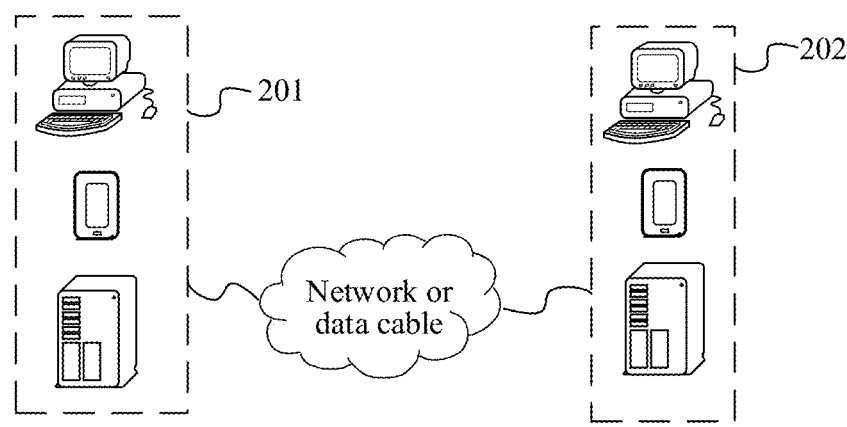
FIG. 2 is a diagram of an implementation environment of an image segmentation method according to an embodiment of the present disclosure.

FIG. 2 is a diagram of an implementation environment of an image segmentation method according to an embodiment of the present disclosure. Referring to FIG. 2, the implementation environment may include a plurality of computer devices. The plurality of computer devices may implement data exchange in a wired connection manner, or may implement data exchange in a wireless network connection manner. This is not limited in the embodiments of the present disclosure.

In an embodiment of the present disclosure, a computer device 201 may be configured to segment an image. In some embodiments, the image may be a medical image, that is, a human tissue image, and a distribution situation of the human tissue is nested, which means that one tissue in the human tissue image has another inner tissue. The image segmentation method may be applied to an analysis scenario of any nested tissue, for example, a scenario such as an analysis of liver and liver cancer, an analysis of pancreas and pancreatic cancer, an analysis of lungs and lung cancer, an analysis of brain tumor, or an analysis of brain cancer. Certainly, the image segmentation may alternatively be applied to another human tissue image segmentation scenario, and details are not listed one by one in the embodiments of the present disclosure. Certainly, the image may be an image of another type, and the image segmentation method may alternatively be applied to another image segmentation scenario, such as a scenery image segmentation scenario.

A computer device 202 may be configured to capture an image and transmit the captured image to the computer device 201, and the computer device 201 provides an image segmentation service. In some embodiments, the computer device 201 may alternatively capture an image, and segment the captured image. This is not limited in the embodiments of the present disclosure. In some embodiments, the computer device 202 may alternatively be configured to store an image obtained from another computer device, and the computer device 201 may obtain the stored image from the computer device 202 for segmentation.

Specifically, both the computer device 201 and the computer device 202 may be provided as terminals, or be provided as servers. This is not limited in the embodiments of the present disclosure.

Figure 3:
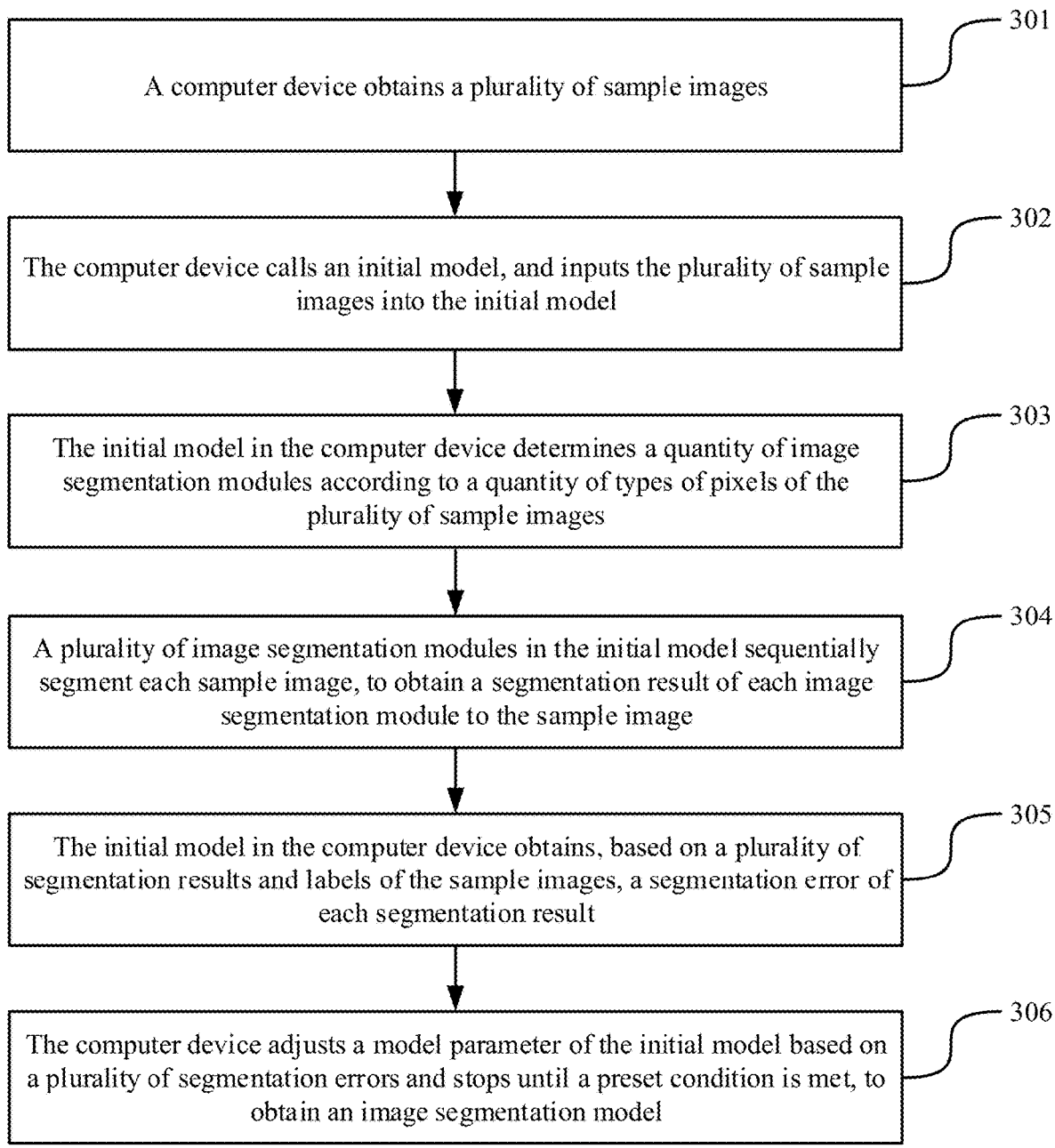
FIG. 3 is a flowchart of an image segmentation model training method according to an embodiment of the present disclosure.

FIG. 3 is a flowchart of an image segmentation model training method according to an embodiment of the present disclosure. The image segmentation model training method may be applied to a computer device, and the computer device may be the computer device 201 in the foregoing implementation environment, or may be another computer device. That is, an image segmentation model may be obtained by performing training on the computer device 201, or after an image segmentation model is obtained by performing training on another computer device, the image segmentation model is processed into a configuration file, and the configuration file is transmitted to the computer device 201. In this case, the computer device 201 has stored the image segmentation model. Certainly, when there is an image segmentation requirement, the computer device 201 may alternatively call an image segmentation model obtained by performing training on another computer device. This is not limited in the embodiments of the present disclosure. Referring to FIG. 3, the method may include the following steps:

301: A computer device obtains a plurality of sample images, where each sample image carries a label, and the label is used for indicating a target segmentation result of the sample image.

The plurality of sample images are target human tissue images, the computer device may train an initial model based on the plurality of sample images, to obtain an image segmentation model, and the image segmentation model obtained in this way may segment the target human tissue images. The target human tissue image may be an image of the nested tissue, such as a liver image, a pancreas image, a lung image, or a brain image.

In some embodiments, the plurality of sample images may be stored in the computer device, so that the computer device may obtain the plurality of stored sample images when image segmentation model training needs to be performed. Each sample image may further carry a label used for indicating a target segmentation result, where the target segmentation result refers to a correct segmentation result of the sample image, or an actual segmentation result of the sample image. In this way, in a model training process, it may be learned that whether segmentation performed on the sample image by a model during the training is accurate, and whether there is a need to continue to train the model, so that when the sample image is segmented by a trained model, the target segmentation result may be obtained, or an obtained segmentation result is quite close to the target segmentation result.

In some embodiments, the plurality of sample images may alternatively be stored in another computer device, and when the computer device needs to perform image segmentation model training, the plurality of sample images may be obtained from the another computer device. This is not limited in the embodiments of the present disclosure. For example, the plurality of sample images may be stored in an image database, and each sample image further carries a label. The foregoing step 301 may be that a computer device obtains a plurality of sample images from an image database.

302: The computer device calls an initial model, and inputs the plurality of sample images into the initial model.

After obtaining the plurality of sample images, the computer device may call an initial model, and train the initial model based on the plurality of sample images, to obtain an image segmentation model, so that an obtained first image can be accurately segmented based on the image segmentation model subsequently. In some embodiments, the term "calling" a model may be understood to be "using," "starting," "retrieving," "initiating," "accessing," or similar actions of the model. For example, the model may be implemented as one or more functions with corresponding data, and the "calling" the model may include invoking the one or more functions to use the model.

In some embodiments, the computer device may store an initial model, and directly call the stored initial model in step 302. In some embodiments, the computer device may alternatively store no initial model. When the computer device needs to train a model, the computer device calls an initial model from another computer device, and performs a subsequent model training process. A specific implementation is not limited in the embodiments of the present disclosure.

A model parameter of the initial model is an initial value, and the computer device may use the plurality of sample images as training samples and validation samples, to train the initial model, that is, adjust the model parameter of the initial model through the sample images, to make a segmentation result obtained when the first image is segmented according to a model parameter adjusted for many times more accurate.

Specifically, the computer device inputs the plurality of sample images into the initial model, and the initial model may segment each sample image, to determine a segmentation capability of the initial model based on a segmentation result of the initial model and the label of the sample image, which is the target segmentation result of the sample image, so that the segmentation capability of the initial model may be continuously improved by adjusting the model parameter of the initial model, to enable the image segmentation model obtained in subsequent training to accurately segment the sample image.

In some embodiments, the model parameter of the initial model, that is, the initial value, may be obtained by performing pre-training based on a plurality of types of sample images. The plurality of types of sample images may include images of a plurality of types of human tissues, and the plurality of types of human tissues are all nested tissues. In this way, the initial model obtains priori knowledge through a pre-training process, so that the initial model has understood images of nested tissues to a specific extent, and may be used for simulating a medical student to study in each department in turn, and therefore, the medical student may be equipped with specific medical knowledge or clinical knowledge. When the initial model obtained in this way performs subsequent model training, a quantity of times of model training may be effectively reduced. Alternatively, the initial model is applicable to segmentation on images of various nested tissues based on the images of various nested tissues, so that the practicability and generality of the initial model and an image segmentation model obtained through training based on the initial model may be effectively improved.

In some embodiments, the computer device may perform matching based on the plurality of obtained sample images and sample images in historical processing data, to obtain similarities between the plurality of sample images and the historical sample images, and then use a model parameter of an image segmentation model of a sample image of which the similarity is the greatest as the model parameter of the initial model, that is, the initial value. In this way, it is taken into consideration that a similar sample image may be processed in the historical processing data, considering that the sample images are similar, parameters required for segmenting the sample images may be similar, and a quantity of iterations in the model training process may be effectively reduced by directly obtaining a model parameter in the historical processing data as the model parameter of the initial model, so that a lot of calculation amount is reduced, and efficiency in an image segmentation model training process is improved.

The foregoing only provides two examples of setting of a model parameter of an initial model. Certainly, the model parameter of the initial model may alternatively be preset by a person skilled in the art. This is not limited in the embodiments of the present disclosure.

303: The initial model in the computer device determines a number of image segmentation modules according to a number of types of pixels of the plurality of sample images.

Figure 4:
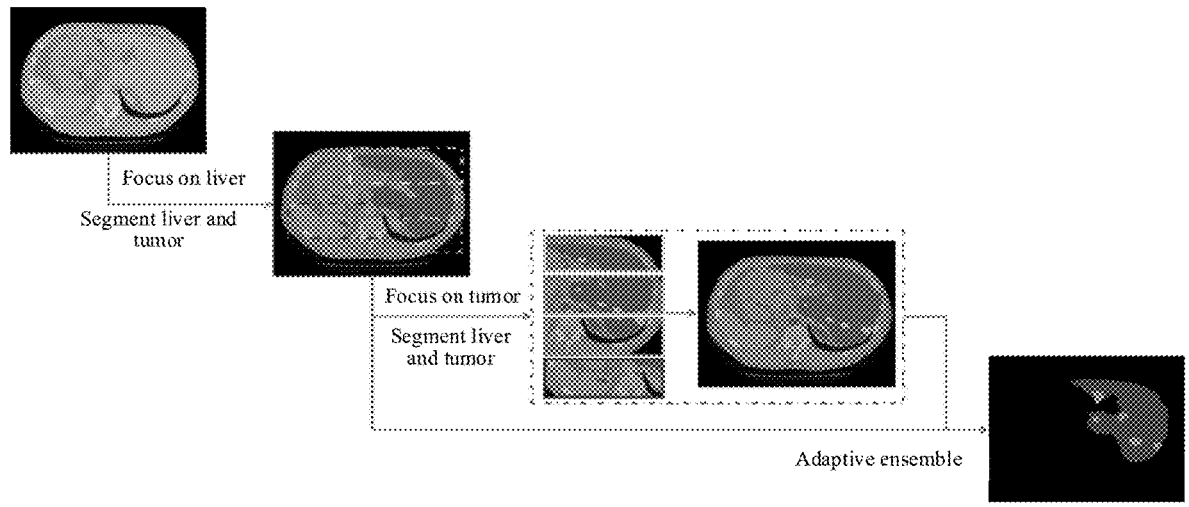
FIG. 4 is a schematic diagram of a flow segmentation process according to an embodiment of the present disclosure.

Different image segmentation modules are used for segmenting different regions of an image. In an embodiment of the present disclosure, the initial model may adopt a flow segmentation solution, that is, sequentially segment a sample image by using a plurality of image segmentation modules. For two adjacent image segmentation modules, after a previous image segmentation module segments the image, the original image may be cropped, and the cropped image is inputted into a latter image segmentation module, so that the latter image segmentation module may continue to segment the image based on a segmentation result of the previous image segmentation module. In this way, the image is segmented for many times in a progressive manner, and the focus is gradually centralized, which implements a segmentation manner in which rough segmentation and fine segmentation are combined, so that the segmentation result is more accurate, and the segmentation manner is also applicable to segmentation tasks with different difficulties. For example, as shown in FIG. 4, segmentation may be first performed once, and a region obtained through the segmentation is then segmented more finely.

The initial model may support segmentation requirements for images of various nested tissues, and may support multi-type segmentation. For different human tissue images, the quantities of types of pixels that need to be determined in the segmentation process may be different. For example, in a brain tumor segmentation scenario, four types of pixels need to be determined, and the four types are: background, edema, non-enhanced tumor, and enhanced tumor. In a liver cancer segmentation scenario, three types of pixels need to be determined, including: background, liver, and liver cancer. The initial model may automatically determine the number of image segmentation modules based on the type data. Therefore, different human tissue images may all use the initial model to perform training to meet segmentation requirements, so that the generality and practicability of the initial model are effectively improved.

Specifically, step 303 may include: The initial model uses a number of types of foreground pixels of the plurality of sample images as the number of the image segmentation modules in the initial model. The types of pixels may include at least two types, and the at least two types may include two types: one type is background, and the other type is foreground, where the foreground is one or more types other than the background in the at least two types. Accordingly, corresponding pixels are respectively background pixels and foreground pixels. That is, pixels of which the type is background are the background pixels, and pixels of which the type is foreground are the foreground pixels. The initial model determines a plurality of image segmentation modules, and the plurality of image segmentation modules respectively correspond to one type of pixels. That is, each image segmentation module focuses on segmenting one type of pixels.

For example, if the human tissue image is a brain image, and the number of types of foreground pixels is three, that is, there are three types of foreground pixels: edema, non-enhanced tumor, and enhanced tumor, accordingly, the initial model may determine that the number of image segmentation modules is three. In this way, segmentation is sequentially performed on the image through the three image segmentation modules. The first image segmentation module focuses on segmenting an edema region, the second image segmentation module focuses on segmenting a non-enhanced tumor region, and the third image segmentation module focuses on segmenting an enhanced tumor region, to as to obtain a segmentation result of the image.

The initial model may directly obtain the number of types of the foreground pixels of the sample image, or may obtain the number of types of the pixels, and subtract one from the number of types of the pixels, to obtain the number of types of the foreground pixels. A specific implementation is not limited in the embodiments of the present disclosure.

In some embodiments, the target segmentation results in the labels of the plurality of sample images are used for indicating types of all pixels of the sample images, and the type data of the pixels of the plurality of sample images may be obtained based on the labels of the plurality of sample images. Accordingly, before step 303, the initial model of the computer device may further analyze the labels of the plurality of sample images, to obtain the number of types of pixels of the plurality of sample images, so as to perform step 303, to determine the number of the image segmentation modules based on the number of types. For example, the initial model may count the number of types of pixels in the target segmentation results in the labels, or may only count the number of types of the foreground pixels.

In the related art, a technician generally needs to analyze a to-be-segmented human tissue image according to own experience, to manually determine the number of the image segmentation modules in the initial model, and the number of the image segmentation modules is fixed. When another human tissue image needs to be segmented, the technician needs to redetermine the number of the image segmentation modules, instead of directly performing training based on the initial model. Therefore, the initial model does not have generality. The initial model in the embodiments of the present disclosure may automatically analyze the sample image, to determine the number of the image segmentation modules. The number of the image segmentation modules is variable, so that when another human tissue image needs to be segmented, the another human tissue image is directly obtained to train the initial model, and the initial model may automatically determine the number of the image segmentation modules. Therefore, the initial model provided in the embodiments of the present disclosure may be applied to scenarios of segmenting a plurality of human tissue images, which has generality and better practicability.

304: A plurality of image segmentation modules in the initial model sequentially segment each sample image, to obtain a segmentation result of each image segmentation module for the sample image.

After determining the number of the image segmentation modules, the initial model may sequentially segment the sample image based on the plurality of image segmentation modules, to obtain a segmentation result. Specifically, for each image segmentation module, feature extraction may be performed on an inputted image based on the model parameter, to obtain features of the image. Each pixel in the image may be then classified based on the extracted features, to obtain the segmentation result.

In some embodiments, the image segmentation module may include at least one image segmentation submodule, and different image segmentation submodules have different depths. For example, the image segmentation module may be implemented by using a deep residual network (ResNet). The image segmentation module may include two image segmentation submodules: ResNet-18 and ResNet-152, where a depth of the ResNet-152 is greater than a depth of the ResNet-18. In a training process of the initial model, for each image segmentation module, the initial model may further obtain, according to an image number of the plurality of sample images, image segmentation submodules corresponding to the image number as the image segmentation module. In this way, for the image number of the sample images, suitable image segmentation submodules may be selected for training, to avoid an occurrence of over-fitting or a problem of a poor segmentation capability of a trained model. Description is made herein by only using an example in which each image segmentation submodule uses a twodimensional (2D) network as a basic network. Specifically, each image segmentation submodule may alternatively use a three-dimensional (3D) network as a basic network, and this is not limited in the embodiments of the present disclosure.

Specifically, the initial model may further store a correspondence between the image number and the image segmentation submodule, and the initial model performs the selection step of the image segmentation submodule based on the correspondence. In some embodiments, a larger image number indicates a greater depth of an obtained image segmentation submodule. In this way, a situation of small data may be effectively dealt with, and the model may also be trained when the number of samples is relatively small, to obtain an image segmentation model with a relatively good segmentation effect.

Further, using an example in which the image segmentation module includes two image segmentation submodules, and an obtaining step of the image segmentation module may be that: When the image number of the plurality of sample images is greater than a preset number, the initial model obtains a first image segmentation submodule; and when the image number of the plurality of sample images is less than or equal to the preset number, the initial model obtains a second image segmentation submodule. A depth of the first image segmentation submodule is greater than a depth of the second image segmentation submodule.

For example, the first image segmentation submodule may be the ResNet-152, and the second image segmentation submodule may be the ResNet-18. Using an example in which the preset number is 100, the obtaining step of the image segmentation module may be that: When the image number of the sample images is less than or equal to 100, the ResNet-18 may be used as a basic model; and when the image number of the sample images is greater than 100, the ResNet-152 may be used as the basic model.

In some embodiments, each image segmentation module may be improved based on unity networking (unet), and unet is particularly applicable to segmentation on a fine structure in the human tissue image due to its unique progressive upsampling and skip connection structure.

After determining the basic model (image segmentation submodule) of each image segmentation module, the initial model may sequentially segment the sample image based on the plurality of image segmentation modules. Specifically, for two adjacent image segmentation modules of the plurality of image segmentation modules, the initial model may segment a third image based on a first image segmentation module, to obtain a first segmentation result, the first image segmentation module being an image segmentation module arranged ahead of the two adjacent image segmentation modules. The initial model then segments, based on a second image segmentation module, a fourth image obtained through cropping based on the first segmentation result, to obtain a second segmentation result, the second image segmentation module being an image segmentation module arranged behind of the two adjacent image segmentation modules, and the fourth image being a partial region of the third image.

The first segmentation result and the second segmentation result are used for indicating a probability of each pixel in the image being each of the at least two types. The third image is an image inputted into the first image segmentation module, and the fourth image is an image obtained through cropping the third image by the first image segmentation module based on the first segmentation result. The fourth image includes pixels of a first type indicated by the first segmentation result, and the first type is a type corresponding to the first image segmentation module.

Similarly, a type corresponding to the second image segmentation module is a second type. Because a target human tissue is a nested tissue, a region in which pixels of the second type are located is inside a region in which the pixels of the first type are located. The initial model may first focus on segmenting the pixels of the first type, and then focus on segmenting the pixels of the second type more finely in the region in which the pixels of the first type are located. Each image segmentation module may classify pixels and determine probabilities of the pixels being the types. This is not only aimed at the type corresponding to the module, but more focused on the type corresponding to the segmentation module.

That is, the first image segmentation module segments the third image, determines the probabilities of the pixels being the types, and preliminarily determines the types of the pixels according to the probabilities. The first image segmentation module focuses on segmenting the first type, so that the fourth image including the region in which the pixels of the first type are located may be inputted into the second image segmentation module, and the second image segmentation module may continue to segment the fourth image, to more focus on segmenting the second type. If the first image segmentation module is the first image segmentation module of the plurality of image segmentation modules of the initial model, the third image is the inputted sample image.

In some embodiments, considering that if differences between pixels of a plurality of target regions of the sample image are relatively great, a problem may be caused in a sampling process that pixels in one target region may be relatively few and even disappear, leading to an inaccurate segmentation result. In this case, it may be further set in the foregoing cropping process: When pixel ratios between the plurality of target regions of the sample image are different, the cropping manner of the sample image may be different. Specifically, in step 303, in a training process of the initial model, the initial model may further obtain a pixel ratio between adjacent target regions in a plurality of target regions corresponding to the plurality of sample images, the target region being a region in which pixels of a target type in the plurality of sample images are located. Accordingly, in step 304, in a case that each of the plurality of image segmentation modules crops an image, the image segmentation module may crop the image according to a magnitude relationship between the pixel ratio between adjacent target regions of the plurality of target regions and a target value.

The target value refers to a threshold of the pixel ratio and may be used for measuring whether the pixel ratio between the target regions exceeds a tolerance of a user, that is, for measuring whether the ratios between the plurality of target regions are unbalanced. The target value may be preset by a person skilled in the art, or the computer device may provide a setting option or an input function for the user, to obtain a value set by the user as the target value, or may be obtained by processing a value set by the user. For example, the user may input 3, and the computer device may obtain a reciprocal of 3, to obtain a target value ⅓. Certainly, 3 may also be used as the target value, and a specific value of the target value is not limited in the embodiments of the present disclosure.

In some embodiments, when the image segmentation module crops the image in the foregoing cropping process, a cropping range may be determined based a size of a target region of a type corresponding to the image segmentation module. For example, a target region of a type corresponding to a current module may be used as a center, and cropping is performed by extending the region by a specific percentage (for example, 10%). In this way, an image inputted into a next module not only includes the target region determined by the current module, but also includes some pixel information around the target region, so that the next module may also segment this part of region again, to avoid an error caused by inaccurate segmentation of one module, thereby improving the accuracy of image segmentation.

Specifically, in step 303, in a training process of the initial model, the initial model may further obtain connected domain ranges of the plurality of target regions corresponding to the plurality of sample images. This step may be obtained by performing connected domain processing on the labels of the sample images. In this way, a standard value is obtained by performing statistical processing on the sample images, and a proper cropping range is determined by using the standard value. Accordingly, in step 304, in a case that each of the plurality of image segmentation modules crops an image, the image segmentation module may crop the image according to a magnitude relationship between the pixel ratio between adjacent target regions of the plurality of target regions and a target value, and the connected domain ranges of the plurality of target regions.

For example, description is made by using the foregoing two adjacent image segmentation modules, and step 304 may be that: For the first image segmentation module, the first image segmentation module crops the third image according to a magnitude relationship between a pixel ratio of a first target region to a second target region and the target value, and a connected domain range of the first target region or the second target region, the first target region being a region in which pixels of a first type corresponding to the first image segmentation module are located, and the second target region being a region in which pixels of a second type corresponding to the second image segmentation module are located.

In the foregoing process, whether the connected domain range is selected according to the first target region or the second target region may be determined according to a size relationship. Specifically, two selection cases may be included: Case 1: when the pixel ratio of the first target region to the second target region is less than the target value, the first image segmentation module crops the third image based on the connected domain range of the first target region. Case 2: when the pixel ratio of the first target region to the second target region is greater than or equal to the target value, the first image segmentation module crops the third image based on the connected domain range of the second target region.

Further, in case 1, when the pixel ratio of the first target region to the second target region is less than the target value, a size of a cropped fourth image is obtained based on the connected domain range of the first target region and a first coefficient. In case 2, when the pixel ratio of the first target region to the second target region is greater than or equal to the target value, the size of the cropped fourth image is obtained based on the connected domain range of the second target region and a second coefficient, where the first coefficient is less than the second coefficient, and the first coefficient and the second coefficient are greater than 1. The first coefficient and the second coefficient may be preset, and values thereof are not limited in the embodiments of the present disclosure.

For example, description is made for the two cases by using an example in which the first coefficient is 10% and the second coefficient is 50%. For case 1, case 1 is a case that the pixel ratio is less than the target value, and the cropping manner is case 1 may be referred to as all-inclusive crop. In this case, for example, the target value is 3, and the pixel ratio of the first target region to the second target region is 2, which is less than the target value. In this way, a difference between a size of the first target region and a size of the second target region is not large, that is, the quantities of the pixels are relatively balanced, so that a probability that the pixels of the second target region disappear when the sample image is cropped is relatively small, and after the first target region is determined based on the first segmentation result, the connected domain range (a statistical value) of the first target region and a range obtained by the first coefficient are used as the cropping range. Therefore, the first target region in the third image may be used as the center and extended by the first coefficient, to obtain the fourth image inputted into the second image segmentation module. Specifically, a range obtained by extending the connected domain range by the first coefficient may be used as the cropping range, for example, a height and a width of the connected domain range may be extended by 5%. Certainly, the first coefficient may alternatively be 110%, and a product of the connected domain range and the first coefficient may be used as the cropping range.

Figure 5:
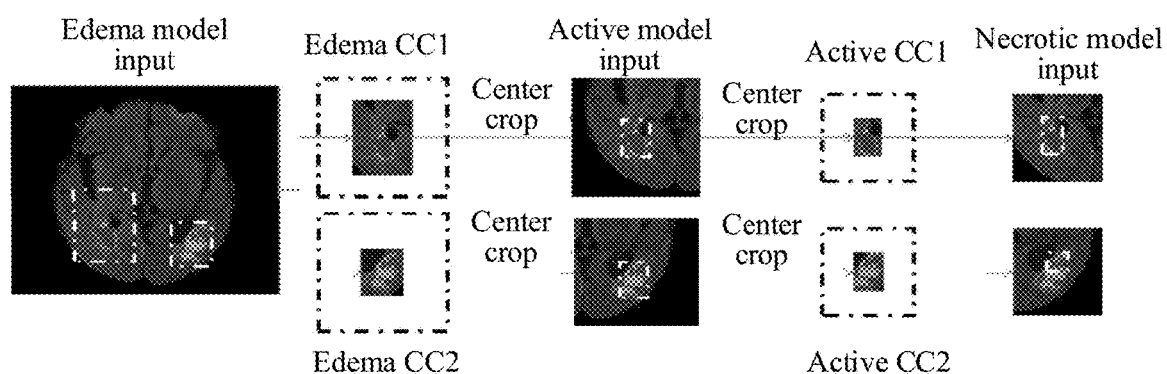
FIG. 5 is a schematic diagram of an image cropping manner according to an embodiment of the present disclosure.

Detailed description is made below for case 1 by using a specific example. Referring to FIG. 5, brain tumor segmentation is used as an example, and three tissues from an outer layer to an inner layer are respectively: edema (represented as edema), non-enhanced tumor (represented as active), and enhanced tumor (represented as necrotic), and CC represents an external label box and is used for representing a cropping range. It may be learned from a statistical result that the quantities of the three types of labels are relatively balanced, that is, pixel ratios between the three regions in the brain image are all less than the target value, and the quantities of the pixels are relatively balanced. The image is cropped by using the target region of the type corresponding to an output of the previous module as a center and by using a connected domain range of the target region. That is, the connected domain range is extended by 10% and used as an input of a model at a next layer. For example, a full image is inputted into the first module, the module mainly segments edema, and crops the image by using edema CC1 in a predicted image as a center and extending a connected domain range of edema (a connected domain range of the first target region) by 10% as a region, to obtain an input of the active model, and the following modules may be deduced by analogy. In the cropping process, if the cropping range exceeds a range of the image inputted into the current module, the cropping range is complemented by using a full image region, and parts beyond the full image region are discarded.

For case 2, case 2 is a case that the pixel ratio is greater than the target value. For example, the target value is 3, and the pixel ratio of the first target region to the second target region is 4, which is greater than the target value. In this way, a difference between the size of the first target region and the size of the second target region is relatively large, that is, the quantities of pixels are unbalanced, and the second target region is quite small relative to the first target region and belongs to a small sample region. Therefore, the cropping range cannot be subject to the connected domain range of the first target region, otherwise a ratio occupied by the second target region is excessively small and is easy to lose. The cropping range cannot completely be subject to the connected domain range of the second target region either, and the cropping range may be complemented by complementing context information. Therefore, the connected domain range of the second target region may be extended by 50%.

Figure 6:
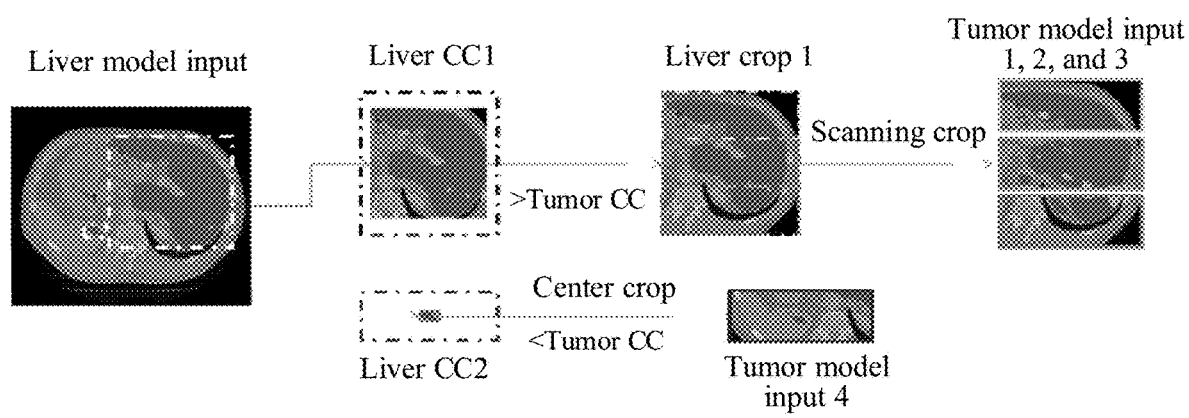
FIG. 6 is a schematic diagram of an image cropping manner according to an embodiment of the present disclosure.

Detailed description is made below for case 2 by using a specific example. Referring to FIG. 6, liver cancer is used as an example. Tissues of a liver image are respectively liver (represented as liver) and liver cancer (represented as tumor) from an outer layer to an inner layer. Liver is the first target region, and tumor is the second target region. According to a statistical result, samples of the liver and the tumor are unbalanced. That is, a pixel ratio of the first target region to the second target region is greater than a tolerance (a target value) of a user, so that the liver belongs to a large sample label, and the tumor belongs to a small sample label. Therefore, when a liver module crops an image, a cropping range is a connected domain range extended by 50%, and this cropping manner may be referred to as scanning crop. A full image is inputted into the first module, and the first module segments the liver and the tumor, where the liver is a focus. There are two connected domains in a predicted result, where Liver CC1 is greater than a connected domain range of a training set of the tumor, and Liver CC2 is less than the connected domain range. Liver Crop is obtained by using the Liver CC1 as a center and extending a crop image by 10% according to a statistical range of a training set of the liver, the Liver Crop is an image to be cropped after context information is complemented based on the first target region, then inputs 1, 2 and 3 of a Tumor model are obtained by scanning the inputted image from top to bottom and from left to right in a range obtained by extending a connected domain range of the tumor (the connected domain range of the second target region) by 50%. A fourth inputted image of the tumor model may be obtained by using the Liver CC2 as a center and extending the connected domain range of the tumor by 50%.

305: The initial model in the computer device obtains, based on a plurality of segmentation results and labels of the sample images, a segmentation error of each segmentation result.

The initial model may use a loss function to obtain the segmentation error of each segmentation result. In some embodiments, during obtaining of the segmentation error of the segmentation result of each image segmentation module in the training process of the initial model, a weight of a type corresponding to the image segmentation module is greater than a weight of another type. In this way, through a weight setting of the loss function, each image segmentation module may be caused to more focus on segmenting a corresponding type. For example, for the first image segmentation module, when the initial model obtains a segmentation error according to a segmentation result of the first image segmentation module, in the loss function, a weight of a first type is greater than a weight of another type. For example, using four types as an example, the weight of the first type is 0.7, and weights of the other three types are all 0.1.

306: The computer device adjusts a model parameter of the initial model based on a plurality of segmentation errors and stops until a preset condition is met, to obtain an image segmentation model, the model parameter of the initial model at least including a module parameter of each image segmentation module.

After obtaining a plurality of segmentation errors, the computer device may adjust the model parameter of the initial model based on the plurality of segmentation errors. When the initial model segments a sample image again by using a model parameter adjusted for many times, the segmentation error is reduced, that is, the accuracy is higher.

In this way, when the preset condition is met, the training of the model is completed. Each time when the sample image is segmented, a process of obtaining the segmentation error and adjusting the model parameter is one iteration, and the foregoing model training process includes a plurality of iterations.

In a specific possible embodiment, the model parameter of the initial model may further include a weight of each image segmentation module. That is, an output of the initial model integrates outputs of segmentation results of the plurality of image segmentation modules, and the output may be a result of calculating a weight sum of the plurality of image segmentation modules. That is, after the plurality of image segmentation modules obtain a plurality of segmentation results, the weighted sum of the plurality of image segmentation modules may be calculated based on the plurality of segmentation results, to output a segmented image. The weight of each image segmentation module may be trained after the image segmentation modules are trained, or the weight of each image segmentation module may alternatively be adjusted when the model parameter of each image segmentation module is adjusted. This is not limited in the embodiments of the present disclosure.

For example, in the related art, multi-model ensemble is generally implemented in a manner of averaging the probabilities or voting. However, in the embodiments of the present disclosure, weights of the plurality of image segmentation modules may use a Dice value, where the Dice value is an evaluation indicator for a segmentation algorithm. A value range of the Dice value may be [0, 1], a greater Dice value indicates better segmentation performance, and the Dice value may be determined based on a cross validation manner.

The preset condition may be determined based on a gradient descent method. For example, the preset condition may be segmentation error convergence, or may be that the number of times of iterations reaches a target number of times. In some embodiments, the weight of the image segmentation module and the preset condition may be determined based on a cross validation manner. Specifically, a number times of first iteration stops may be determined based on a k-fold cross validation manner, for example, may be determined based on a five-fold cross validation manner. Using the five-fold cross validation as an example, the sample image may be divided into five parts, and four parts thereof are used as training sets, and the other one part is used as a validation set. Then training and validation are performed for many times by using another combination manner. Certainly, training and validation may alternatively be performed on the initial model by using a different combination manner after the different combination manner is determined. By performing training and validation on a plurality of combinations of sample data, the initial model traverses all the sample data, so that the generality of the trained model is better, and the segmentation result is more accurate. The cross validation process is mainly to perform validation on the trained model through validation data each time when a specific number of times of iterations are performed, if the segmentation error meets the preset condition, the process may stop, and if the segmentation error does not meet the preset condition, the foregoing iteration may continue. Details are not repeated in the embodiments of the present disclosure.

The foregoing step 303 to step 306 are a process of training the initial model based on the plurality of sample images, to obtain the image segmentation model. In the model training process, the initial model may automatically perform analysis according to the sample images, to determine the number of the image segmentation modules, so that the initial model may be applied to a plurality of scenarios, which has better generality, practicability, and applicability.

After the image segmentation model is obtained through training, the computer device calls, in response to obtaining a first image to be segmented, the image segmentation model, and segment the first image by using the image segmentation model based on a plurality of image segmentation modules, to output a second image, where the first image is also a target human tissue image.

If the image segmentation module uses a 2D network as a basic network, the inputted sample image may alternatively be a 3D image, and the initial model may alternatively convert the 3D image into a 2D image sequence. That is, slices of the 3D image are obtained, and the slices are inputted into the image segmentation module for segmentation.

Figure 7:
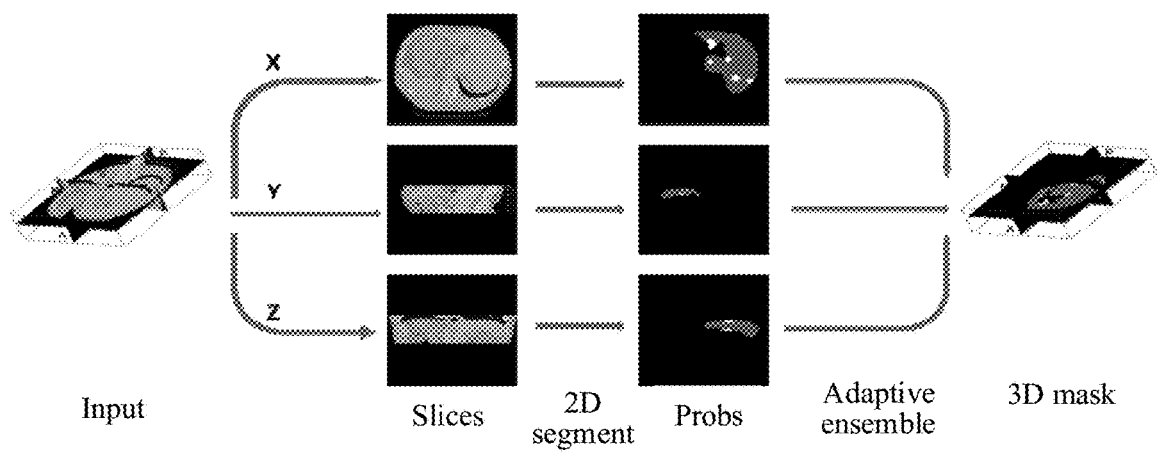
FIG. 7 is a schematic structural diagram of an image segmentation model according to an embodiment of the present disclosure.

In some embodiments, the initial model and the image segmentation model both include three view sub-models, and the three view sub-models are respectively used for obtaining slices of an image according to different viewing angles and segmenting the image. For example, as shown in FIG. 7, the three view sub-models may respectively obtain slices of the image according to an x axis, a y axis, and a z axis, and respectively segment the slices. Segmentation results of the three view sub-models are eventually integrated, to output a segmented image.

In this way, by obtaining slices of the image from different viewing angles, the segmentation results of different viewing angles are integrated, so that the accuracy of image segmentation of the image segmentation model may be improved. Accordingly, when determining the number of the image segmentation modules, the initial model may use the number of types of foreground pixels of the plurality of sample images as the number of the image segmentation modules in each view sub-model. That is, the number of the image segmentation modules in the each view sub-model is the number of types of the foreground pixels. In the model training process, the each view sub-model may sequentially segment the sample image based on the plurality of image segmentation modules, to integrate the plurality of segmentation results of the three view sub-models, to obtain the final image. A segmentation result of the each view sub-model of the three view sub-models includes image segmentation results of the plurality of image segmentation modules.

Figure 8:
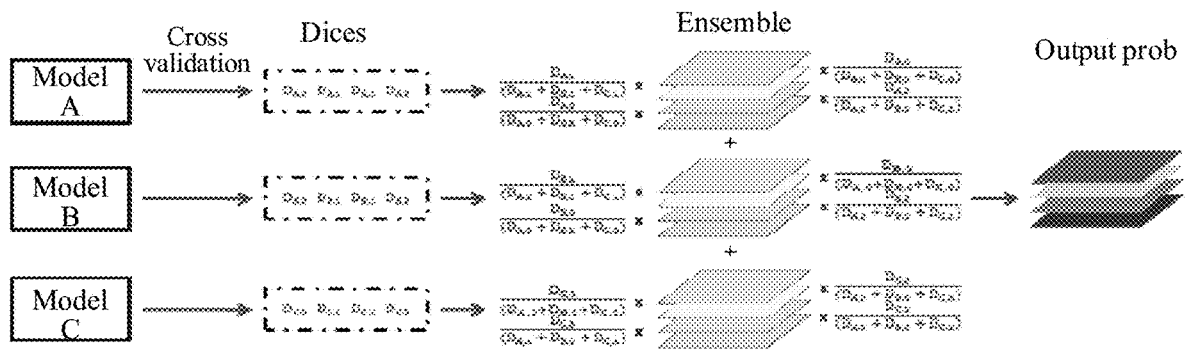
FIG. 8 is a schematic diagram of a segmentation result ensemble manner according to an embodiment of the present disclosure.

In some embodiments, the each view sub-model may also respectively correspond to a weight, that is, the Dice value, and the weight of the each view sub-model may also be determined based on a cross validation manner. For example, as shown in FIG. 8, four types are used as an example. Each view sub-model includes three image segmentation modules, and the three modules are respectively: a model A, a model B, and a model C. The three modules sequentially segment an image, to obtain segmentation results of three phases, and when the three segmentation results are integrated, a weighted sum of the segmentation results may be calculated based on weights (Dice values) of the three modules, to obtain a segmentation result of one view sub-model. Certainly, description is made herein by using only one view sub-model as an example. When segmentation results of a plurality of view sub-models are integrated, a weight of each view sub-model may also be considered, to obtain a finally outputted image.

Accordingly, in the process of segmenting the first image based on the image segmentation model obtained through training, the computer device may obtain, by using the three view sub-models, at least one slice of the first image respectively according to corresponding viewing angles, segment each slice by using the plurality of image segmentation modules in the each view sub-model, and output the second image based on segmentation results of the three view sub-models. A segmentation result of the each view sub-model of the three view sub-models includes image segmentation results of the plurality of image segmentation modules. A process of outputting the second image based on segmentation results of the three view sub-models is similar to the training process and may be: calculating, by the computer device, a weighted sum of the image segmentation results of the plurality of image segmentation modules of the three view sub-models based on weights corresponding to the three view sub-models and a weight corresponding to each image segmentation module in the each view sub-model, to output the second image. Details are not repeated in the embodiments of the present disclosure.

In the embodiments of the present disclosure, the image segmentation model is obtained by training the initial model based on the sample image, so that when the first image is obtained, the first image may be segmented based on the image segmentation model obtained through training. The initial model may automatically determine the number of the image segmentation modules based on the number of types of pixels of the sample image, so that different human tissue images may all be directly trained based on the initial model without manual intervention to redesign a model. Therefore, the generality, applicability, and practicability of the image segmentation model are good. Further, the method has generality and pertinence to structural segmentation of all nested clinical tissues, and segmentation performance and timeliness are effectively improved. In addition, the variability of the structure of the initial model makes the scalability of the method quite strong.

Figure 9:
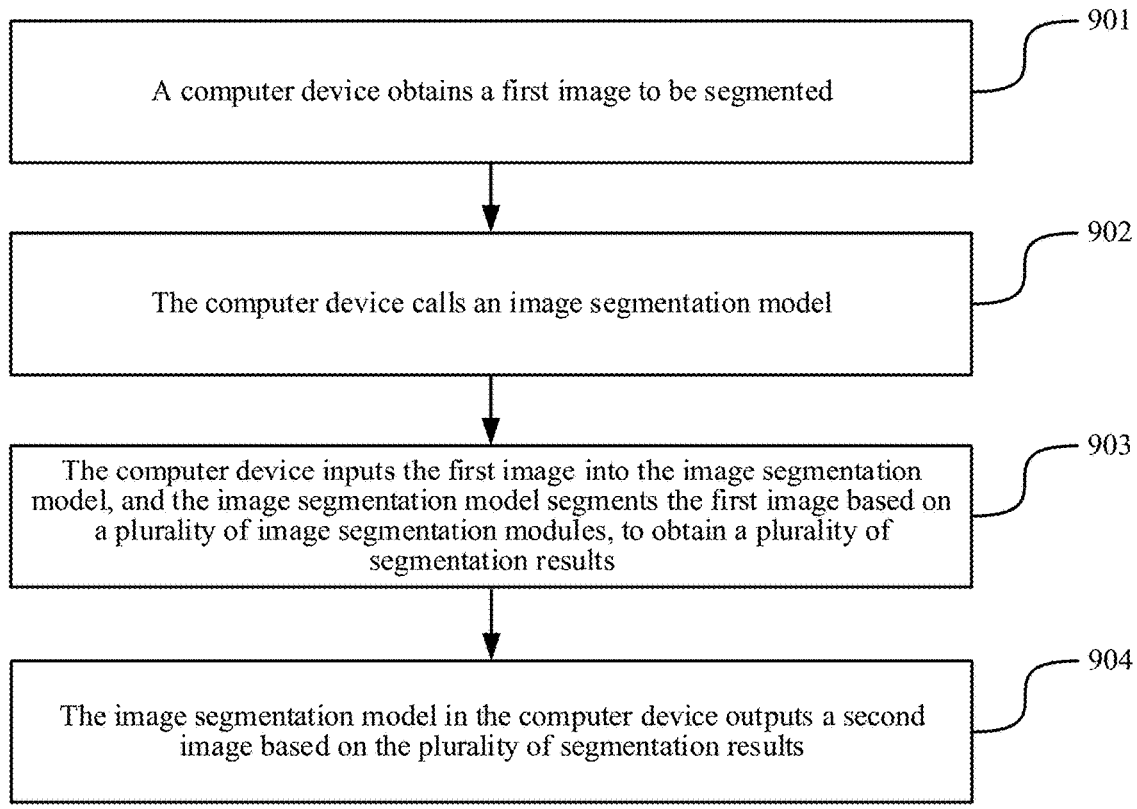
FIG. 9 is a flowchart of an image segmentation method according to an embodiment of the present disclosure.

FIG. 9 is a flowchart of an image segmentation method according to an embodiment of the present disclosure. The image segmentation method is applied to a computer device, and the computer device may be the computer device 201 in the foregoing implementation environment. In an embodiment of the present disclosure, detailed description is mainly made for a process of calling the image segmentation model when a first image to be segmented is obtained, segmenting the first image by using the image segmentation model based on a plurality of image segmentation modules, and outputting a second image. Referring to FIG. 9, the image segmentation method may include the following steps:

901: A computer device obtains a first image to be segmented.

The computer device performs step 901 when an image segmentation operation is detected, or may receive a first image to be segmented that is imported by a user, or may receive an image segmentation request transmitted by another computer device. The image segmentation request carries the first image to be segmented, and the first image to be segmented is extracted from the image segmentation request, or the image segmentation request may carry related information of the first image, so that the computer device may perform step 901 based on the related information. Certainly, the computer device may alternatively obtain the first image to be segmented according to an imaging principle. A specific obtaining manner and obtaining time of the first image to be segmented are not limited in the embodiments of the present disclosure.

For example, the another computer device may obtain the first image to be segmented according to the imaging principle and transmit the first image to be segmented to the computer device. The computer device obtains the first image to be segmented, and the first image may be the target human tissue image. In this way, the following steps may be performed, to segment the first image by using an image segmentation model obtained through training according to sample images of the target human tissue image.

902: The computer device calls an image segmentation model.

The image segmentation model includes a plurality of image segmentation modules. A number of the plurality of image segmentation modules is determined by the initial model in the embodiment shown in FIG. 3 when the initial model is trained. Different image segmentation modules are used for segmenting different regions of an image, and the plurality of image segmentation modules may sequentially segment the first image, to implement a flow segmentation solution.

The image segmentation model may be prestored in the computer device. In some embodiments, the computer device is the computer device shown in FIG. 3, and the image segmentation model stored in the computer device is obtained through training on the computer device. In some embodiments, the computer device is not the computer device shown in FIG. 3, and the image segmentation model may be obtained through training on the another computer device, and the computer device may obtain the trained image segmentation model from the another computer device. Certainly, the image segmentation model may alternatively not be stored in the computer device, and when the computer device obtains the first image to be segmented and needs to segment the first image, the computer device may call the image segmentation model from the another computer device in real time. This is not limited in the embodiments of the present disclosure.

Similar to the content in step 306, the image segmentation model may further include three view sub-models, and the three view sub-models are respectively used for obtaining slices of an image according to different viewing angles and segmenting the image. Accordingly, each view sub-model includes a plurality of image segmentation modules. The plurality of image segmentation modules respectively correspond to one type of pixels. That is, the plurality of image segmentation modules are respectively used for focusing on segmenting one type of pixels.

903: The computer device inputs the first image into the image segmentation model, and the image segmentation model segments the first image based on a plurality of image segmentation modules, to obtain a plurality of segmentation results.

Similar to the content in step 306, if the image segmentation model includes three view sub-models, step 903 may be that: The computer device inputs the first image into the image segmentation model, the three view sub-models in the image segmentation model respectively obtain at least one slice of the first image according to corresponding viewing angles, and a plurality of image segmentation modules in each view sub-model segment each slice, to output a second image based on segmentation results of the three view sub-models.

Similar to the content in step 304, each image segmentation module may segment and crop the image, to obtain a segmentation result. Specifically, for two adjacent image segmentation modules of the plurality of image segmentation modules, the computer device may segment a third image based on a first image segmentation module, to obtain a first segmentation result, the first image segmentation module being an image segmentation module arranged ahead of the two adjacent image segmentation modules. The computer device segments, based on a second image segmentation module, a fourth image obtained through cropping based on the first segmentation result, to obtain a second segmentation result, the second image segmentation module being an image segmentation module arranged behind of the two adjacent image segmentation modules, and the fourth image being a partial region of the third image. The fourth image includes pixels of a first type indicated by the first segmentation result, and the first type is a type corresponding to the first image segmentation module.

904: The image segmentation model in the computer device outputs a second image based on the plurality of segmentation results.

In a case that the image segmentation model includes three view sub-models, a segmentation result of the each view sub-model in the three view sub-models includes image segmentation results of the plurality of image segmentation modules. Accordingly, in a process of outputting the second image by the image segmentation model based on segmentation results of the three view sub-models, a weighted sum of the image segmentation results of the plurality of image segmentation modules of the three view sub-models may also be calculated based on weights corresponding to the three view sub-models and a weight corresponding to each image segmentation module in the each view sub-model, to output the second image. The weights corresponding to the three view sub-models and the weight corresponding to each image segmentation module in the each view sub-model are determined based on a cross validation manner. The content is similar to related content in the embodiment shown in FIG. 3, and details are not repeated in the embodiments of the present disclosure.

After step 904, that is, after the second image is obtained, the computer device may store the second image. Certainly, the computer device may alternatively store the first image and the second image correspondingly, and if the computer device performs the image segmentation process based on an image segmentation request of another computer device, the computer device may transmit the second image to the another computer device. This is not limited in the embodiments of the present disclosure.

In the embodiments of the present disclosure, the image segmentation model is obtained by training the initial model based on the sample image, so that when the first image is obtained, the first image may be segmented based on the image segmentation model obtained through training. The initial model may automatically determine the number of the image segmentation modules based on the number of types of pixels of the sample image, so that different human tissue images may all be directly trained based on the initial model without manual intervention to redesign a model. Therefore, the generality, applicability, and practicability of the image segmentation model are good.

Features from the above discussed technical solutions may be arbitrarily combined to form other embodiments of the present disclosure, and details are not repeated herein.

Further, the steps of the embodiments of the present disclosure are not necessarily performed according to a sequence indicated by step numbers. Unless explicitly specified in this specification, the sequence for performing the steps is not strictly limited, and the steps may be performed in other sequences. In addition, at least some of the steps in the embodiments may include a plurality of sub-steps or a plurality of stages. These sub-steps or stages are not necessarily performed at the same moment, but may be performed at different moments. These sub-steps or stages are not necessarily performed sequentially, but may be performed in turn or alternately with other steps or at least some sub-steps or stages of the other steps.

In an embodiment, a computer device is further provided. The computer device includes an image segmentation apparatus, the image segmentation apparatus includes various modules, and each module may be all or partially implemented by software, hardware, or a combination thereof.

Figure 10:
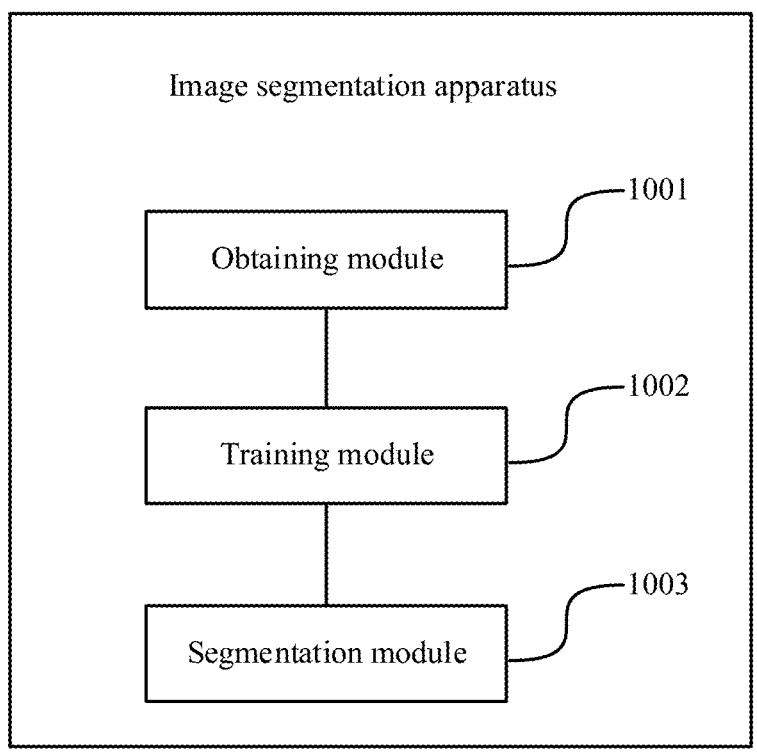
FIG. 10 is a schematic structural diagram of an image segmentation apparatus according to an embodiment of the present disclosure.

FIG. 10 is a schematic structural diagram of an image segmentation apparatus according to an embodiment of the present disclosure. Referring to FIG. 10, the apparatus includes: an obtaining module 1001, a training module 1002, and a segmentation module 1003.

The obtaining module 1001 is configured to obtain a plurality of sample images. The training module 1002 is configured to call an initial model, input the plurality of sample images into the initial model, and train the initial model based on the plurality of sample images to obtain an image segmentation model, the initial model being used for determining a number of image segmentation modules according to a number of types of pixels of the plurality of sample images, and different image segmentation modules being used for segmenting different regions of an image.

The segmentation module 1003 is configured to call the image segmentation model in response to obtaining a first image to be segmented, and segment the first image by using the image segmentation model based on a plurality of image segmentation modules, to output a second image, the plurality of sample images and the first image all being target human tissue images.

In some embodiments, the training module 1002 is configured to use a number of types of foreground pixels of the plurality of sample images as the number of the image segmentation modules in the initial model.

In some embodiments, each sample image carries a label, and the label is used for indicating a target segmentation result of the sample image; and accordingly, the training module 1002 is further configured to analyze labels of the plurality of sample images, to obtain the number of types of pixels of the plurality of sample images.

In some embodiments, the segmentation module 1003 is configured to: for two adjacent image segmentation modules of the plurality of image segmentation modules, segment a third image based on a first image segmentation module, to obtain a first segmentation result, the first image segmentation module being an image segmentation module arranged ahead of the two adjacent image segmentation modules; and segment, based on a second image segmentation module, a fourth image obtained through cropping based on the first segmentation result, to obtain a second segmentation result, the second image segmentation module being an image segmentation module arranged behind of the two adjacent image segmentation modules, and the fourth image being a partial region of the third image.

In some embodiments, the plurality of image segmentation modules respectively correspond to one type of pixels; the fourth image includes pixels of a first type indicated by the first segmentation result, and the first type is a type corresponding to the first image segmentation module; and during obtaining of a segmentation error of a segmentation result of each image segmentation module in a training process of the initial model, a weight of a type corresponding to the image segmentation module is greater than a weight of another type.

In some embodiments, in a training process of the initial model, the obtaining module 1001 is further configured to obtain a pixel ratio between adjacent target regions in a plurality of target regions corresponding to the plurality of sample images, the target region being a region in which pixels of a target type in the plurality of sample images are located. The apparatus further includes a cropping module, configured to crop, in a case that each image segmentation module of the plurality of image segmentation modules crops an image, the image according to a magnitude relationship between the pixel ratio between adjacent target regions of the plurality of target regions and a target value.

In some embodiments, the obtaining module 1001 is further configured to obtain, in a training process of the initial model, connected domain ranges of the plurality of target regions corresponding to the plurality of sample images; and the cropping module is configured to crop, in a case that each image segmentation module of the plurality of image segmentation modules crops an image, the image according to a magnitude relationship between the pixel ratio between adjacent target regions of the plurality of target regions and a target value and the connected domain ranges of the plurality of target regions.

In some embodiments, the cropping module is configured to: for the first image segmentation module, crop the third image according to a magnitude relationship between a pixel ratio of a first target region to a second target region and the target value, and a connected domain range of the first target region or the second target region, the first target region being a region in which pixels of a first type corresponding to the first image segmentation module are located, and the second target region being a region in which pixels of a second type corresponding to the second image segmentation module are located.

In some embodiments, the cropping module is further configured to: crop the third image based on the connected domain range of the first target region in a case that the pixel ratio of the first target region to the second target region is less than the target value; and crop the third image based on the connected domain range of the second target region in a case that the pixel ratio of the first target region to the second target region is greater than or equal to the target value.

In some embodiments, when the third image is cropped based on the connected domain range of the first target region, a size of a cropped fourth image is obtained based on the connected domain range of the first target region and a first coefficient. When the third image is cropped based on the connected domain range of the second target region, the size of the cropped fourth image is obtained based on the connected domain range of the second target region and a second coefficient, where the first coefficient is less than the second coefficient.

In some embodiments, both the initial model and the image segmentation model include three view sub-models, and the three view sub-models are respectively used for obtaining slices of an image according to different viewing angles and segmenting the image. Accordingly, the training module 1002 is configured to use the number of types of foreground pixels of the plurality of sample images as the number of the image segmentation modules in each view sub-model. Accordingly, the segmentation module 1003 is configured to obtain, by using the three view sub-models, at least one slice of the first image respectively according to corresponding viewing angles, segment each slice by using the plurality of image segmentation modules in the each view sub-model, and output the second image based on segmentation results of the three view sub-models.

In some embodiments, a segmentation result of the each view sub-model in the three view sub-models includes image segmentation results of the plurality of image segmentation modules. Accordingly, the segmentation module 1003 is further configured to calculate a weighted sum of the image segmentation results of the plurality of image segmentation modules of the three view sub-models based on weights corresponding to the three view sub-models and a weight corresponding to each image segmentation module in the each view sub-model, to output the second image, the weights corresponding to the three view sub-models and the weight corresponding to each image segmentation module in the each view sub-model being determined based on a cross validation manner.

In some embodiments, the training module 1002 is further configured to, in a training process of the initial model, for each image segmentation module, obtain, according to an image number of the plurality of sample images, image segmentation submodules corresponding to the image number as the image segmentation module, the image segmentation module including at least one image segmentation submodule, and different image segmentation submodules having different depths.

According to the apparatus provided in the embodiments of the present disclosure, the image segmentation model is obtained by training the initial model based on the sample image, so that when the first image is obtained, the first image may be segmented based on the image segmentation model obtained through training. The initial model may automatically determine the number of the image segmentation modules based on the number of types of pixels of the sample image, so that different human tissue images may all be directly trained based on the initial model without manual intervention to redesign a model. Therefore, the generality, applicability, and practicability of the image segmentation model are good.

When the image segmentation apparatus provided in the foregoing embodiments performs image segmentation, the division of the functional modules is merely used as an example for description. In the practical application, the functions may be distributed to and implemented by different functional modules according to the requirements, that is, an internal structure of a computer device is divided into different functional modules, so as to finish all or some of the functions described above. In addition, the image segmentation apparatus provided in the foregoing embodiments belongs to the same idea as the image segmentation method. See the method embodiment for a specific implementation process thereof, and details are not described herein again.

Figure 11:
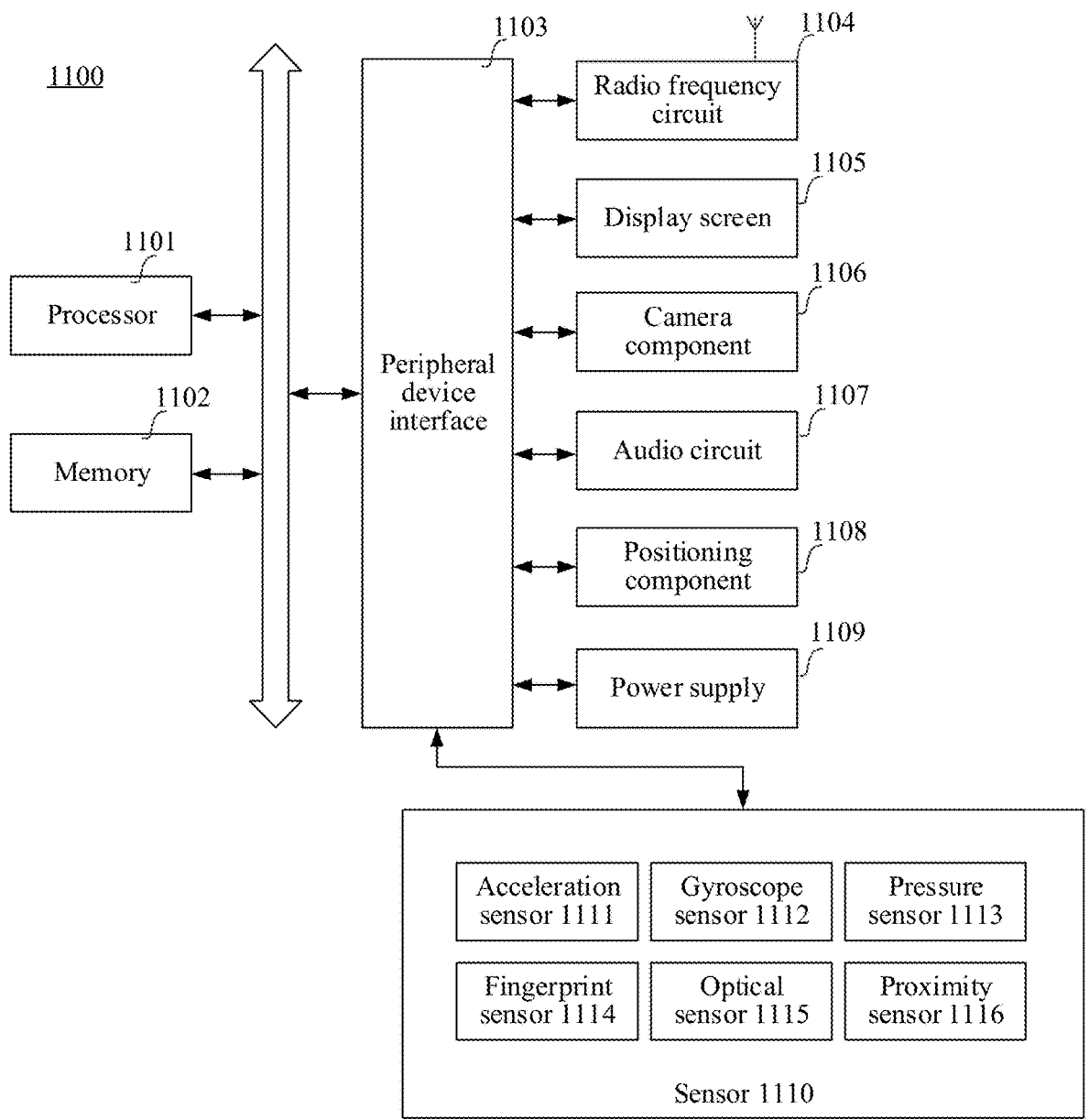
FIG. 11 is a schematic structural diagram of a terminal according to an embodiment of the present disclosure.
Figure 12:
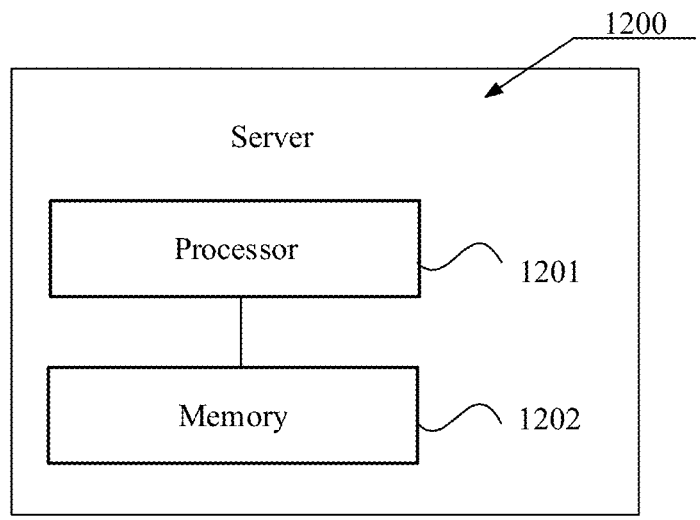
FIG. 12 is a schematic structural diagram of a server according to an embodiment of the present disclosure.

The computer device may be provided as a terminal shown in FIG. 11, or may be provided as a server shown in FIG. 12. This is not limited in the embodiments of the present disclosure.

FIG. 11 is a schematic structural diagram of a terminal according to an embodiment of the present disclosure. The terminal 1100 may be a smartphone, a tablet computer, a moving picture experts group audio layer III (MP3) player, a moving picture experts group audio layer IV (MP4) player, a notebook computer, or a desktop computer. The terminal 1100 may also be referred to as user equipment, a portable terminal, a laptop terminal, a desktop terminal, or another name.

Generally, the terminal 1100 includes a processor 1101 and a memory 1102.

The processor 1101 may include one or more processing cores, for example, may be a 4-core processor or an 8-core processor. The processor 1101 may be implemented in at least one hardware form of digital signal processing (DSP), a field-programmable gate array (FPGA), and a programmable logic array (PLA). The processor 1101 may alternatively include a main processor and a coprocessor. The main processor is a processor configured to process data in an awake state, also referred to as a central processing unit (CPU), and the coprocessor is a low-power consumption processor configured to process data in an idle state. In some embodiments, the processor 1101 may be integrated with a graphics processing unit (GPU). The GPU is responsible for rendering and drawing content to be displayed by a display screen. In some embodiments, the processor 1101 may further include an artificial intelligence (AI) processor. The AI processor is configured to process a calculation operation related to machine learning.

The memory 1102 may include one or more computer-readable storage media. The computer-readable storage medium may be non-transient. The memory 1102 may further include a high-speed random access memory, and a non-volatile memory such as one or more magnetic disk storage devices and a flash memory device. In some embodiments, the non-transient computer-readable storage medium in the memory 1102 is configured to store at least one instruction, and the at least one instruction is configured to be executed by the processor 1101 to implement the image segmentation model training method or the image segmentation method according to the method embodiment of the present disclosure.

In some embodiments, the terminal 1100 further optionally includes a peripheral device interface 1103 and at least one peripheral device. The processor 1101, the memory 1102 and the peripheral device interface 1103 may be connected through a bus or a signal cable. Each peripheral device may be connected to the peripheral device interface 1103 through a bus, a signal cable, or a circuit board. Specifically, the peripheral device includes: at least one of a radio frequency (RF) circuit 1104, a touch display screen 1105, a camera component 1106, an audio circuit 1107, a positioning component 1108, and a power supply 1109.

The peripheral device interface 1103 may be configured to connect at least one peripheral device related to input/output (I/O) to the processor 1101 and the memory 1102. In some embodiments, the processor 1101, the memory 1102, and the peripheral device interface 1103 are integrated into the same chip or circuit board. In some other embodiments, any one or two of the processor 1101, the memory 1102, and the peripheral device interface 1103 may be implemented on an independent chip or circuit board, and the implementation is not limited in this embodiment.

The RF circuit 1104 is configured to receive and transmit an RF signal, also referred to as an electromagnetic signal. The RF circuit 1104 communicates with a communications network and another communication device by using the electromagnetic signal. The RF circuit 1104 converts an electrical signal into an electromagnetic signal for transmission, or converts a received electromagnetic signal into an electrical signal. Optionally, the RF circuit 1104 includes an antenna system, an RF transceiver, one or more amplifiers, a tuner, an oscillator, a digital signal processor, a codec chip set, a subscriber identity module card, and the like. The RF circuit 1104 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 1104 may further include a near field communication (NFC) related circuit, and this is not limited in the present disclosure.

The display screen 1105 is configured to display a user interface (UI). The UI may include a graph, a text, an icon, a video, and any combination thereof. When the display screen 1105 is a touch display screen, the display screen 1105 is further capable of acquiring a touch signal on or above a surface of the display screen 1105. The touch signal may be inputted to the processor 1101 for processing as a control signal. In this case, the display screen 1105 may further be configured to provide a virtual button and/or a virtual keyboard, which is also referred to as a soft button and/or a soft keyboard. In some embodiments, there may be one display screen 1105, disposed on a front panel of the terminal 1100. In some other embodiments, there may be two display screens 1105, respectively disposed on different surfaces of the terminal 1100 or designed in a foldable shape. In some embodiments, the display screen 1105 may be a flexible display screen, disposed on a curved surface or a folded surface of the terminal 1100. Even, the display screen 1105 may further be set to have a non-rectangular irregular pattern, that is, a special-shaped screen. The display screen 1105 may be prepared by using materials such as a liquid crystal display (LCD), an organic light-emitting diode (OLED), or the like.

The camera component 1106 is configured to collect an image or a video. Optionally, the camera component 1106 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1106 may further include a flash. The flash may be a single color temperature flash, or may be a double color temperature flash. The double color temperature flash refers to a combination of a warm flash and a cold flash, and may be configured to perform light ray compensation at different color temperatures.

The audio circuit 1107 may include a microphone and a loudspeaker. The microphone is configured to collect sound waves of a user and an environment, and convert the sound waves into electrical signals and input the electrical signals into the processor 1101 for processing, or input the electrical signals into the RF circuit 1104 to implement speech communication. For the purpose of stereo collection or noise reduction, there may be a plurality of microphones, disposed at different parts of the terminal 1100 respectively. The microphone may be further an array microphone or an omnidirectional collection microphone. The loudspeaker is configured to convert electrical signals from the processor 1101 or the RF circuit 1104 into sound waves. The loudspeaker may be a conventional thin-film loudspeaker or a piezoelectric ceramic loudspeaker. In a case that the loudspeaker is the piezoelectric ceramic loudspeaker, electrical signals not only can be converted into sound waves that can be heard by human, but also can be converted into sound waves that cannot be heard by human for ranging and the like. In some embodiments, the audio circuit 1107 may also include an earphone jack.

The positioning component 1108 is configured to determine a current geographic location of the terminal 1100, to implement a navigation or a location based service (LBS). The positioning component 1108 may be a positioning component based on the Global Positioning System (GPS) of the United States, the BeiDou Navigation Satellite System of China, the GLONASS System of Russia, or the GALILEO System of the European Union.

The power supply 1109 is configured to supply power for various components in the terminal 1100. The power supply 1109 may be an alternating current, a direct current, a disposable battery, or a rechargeable battery. In a case that the power supply 1109 includes the rechargeable battery, the rechargeable battery may support a wired charging or a wireless charging. The rechargeable battery may further be configured to support a quick charge technology.

In some embodiments, the terminal 1100 may also include one or more sensors 1110. The one or more sensors 1110 include, but are not limited to, an acceleration sensor 1111, a gyroscope sensor 1112, a pressure sensor 1113, a fingerprint sensor 1114, an optical sensor 1115, and a proximity sensor 1116.

The acceleration sensor 1111 may detect accelerations on three coordinate axes of a coordinate system established by the terminal 1100. For example, the acceleration sensor 1111 may be configured to detect components of gravity acceleration on the three coordinate axes. The processor 1101 may control, according to a gravity acceleration signal collected by the acceleration sensor 1111, the touch display screen 1105 to display the user interface in a frame view or a portrait view. The acceleration sensor 1111 may be further configured to collect game or user motion data.

The gyroscope sensor 1112 may detect a body direction and a rotation angle of the terminal 1100. The gyroscope sensor 1112 may cooperate with the acceleration sensor 1111 to collect a 3D action by the user on the terminal 1100. The processor 1101 may implement the following functions according to the data collected by the gyroscope sensor 1112: motion sensing (such as changing the UI according to a tilt operation of the user), image stabilization during shooting, game control, and inertial navigation.

The pressure sensor 1113 may be disposed on a side frame of the terminal 1100 and/or a lower layer of the touch display screen 1105. When the pressure sensor 1113 is disposed on the side frame of the terminal 1100, a holding signal of the user to the terminal 1100 may be detected, and left/right hand identification and a quick operation may be performed by the processor 1101 according to the holding signal collected by the pressure sensor 1113. When the pressure sensor 1113 is disposed at the lower layer of the touch display screen 1105, the processor 1101 controls an operable control on the UI according to a pressure operation performed by the user on the touch display screen 1105. The operable control includes at least one of a button control, a scroll bar control, an icon control, and a menu control.

The fingerprint sensor 1114 is configured to collect a fingerprint of the user. The processor 1101 identifies an identity of the user according to the fingerprint collected by the fingerprint sensor 1114, or the fingerprint sensor 1114 identifies an identity of the user according to the collected fingerprint. When the identity of the user is identified as a trusted identity, the processor 1101 authorizes the user to perform a related sensitive operation. The sensitive operation includes unlocking a screen, viewing encrypted information, downloading software, payment, changing settings, and the like. The fingerprint sensor 1114 may be disposed on a front face, a back face, or a side face of the terminal 1100.

When a physical button or a vendor logo is disposed on the terminal 1100, the fingerprint sensor 1114 may be integrated together with the physical button or the vendor logo.

The optical sensor 1115 is configured to collect ambient light intensity. In an embodiment, the processor 1101 may control the display brightness of the touch display screen 1105 according to the ambient light intensity collected by the optical sensor 1115. Specifically, when the ambient light intensity is relatively high, the display brightness of the touch display screen 1105 is increased; and when the ambient light intensity is relatively low, the display brightness of the touch display screen 1105 is decreased. In another embodiment, the processor 1101 may further dynamically adjust shooting parameters of the camera component 1106 according to the ambient light intensity collected by the optical sensor 1115.

The proximity sensor 1116, also referred to as a distance sensor, is usually disposed on a front panel of the terminal 1100. The proximity sensor 1116 is configured to collect a distance between a user and the front surface of the terminal 1100. In an embodiment, when the proximity sensor 1116 detects that the distance between the user and the front surface of the terminal 1100 gradually becomes small, the touch display screen 1105 is controlled by the processor 1101 to switch from a screen-on state to a screen-off state; and when the proximity sensor 1116 detects that the distance between the user and the front surface of the terminal 1100 gradually becomes large, the touch display screen 1105 is controlled by the processor 1101 to switch from the screen-off state to the screen-on state.

A person skilled in the art may understand that the structure shown in FIG. 11 constitutes no limitation to the terminal 1100, and the terminal 1100 may include more or fewer components than those shown in the figure, or some components may be combined, or a different component deployment may be used.

FIG. 12 is a schematic structural diagram of a server according to an embodiment of the present disclosure. The server 1200 may vary greatly due to different configurations or performance, and may include one or more central processing units (CPUs) 1201 and one or more memories 1202. The memory 1202 stores at least one instruction, the at least one instruction being loaded and executed by the processor 1201 to implement the image segmentation model training method or the image segmentation method provided in the foregoing method embodiments. Certainly, the server may further include components such as a wired or wireless network interface, a keyboard, and an input/output interface, to facilitate inputs/outputs. The server may further include another component configured to implement functions of a device, and details are not described herein again.

Figure 13:
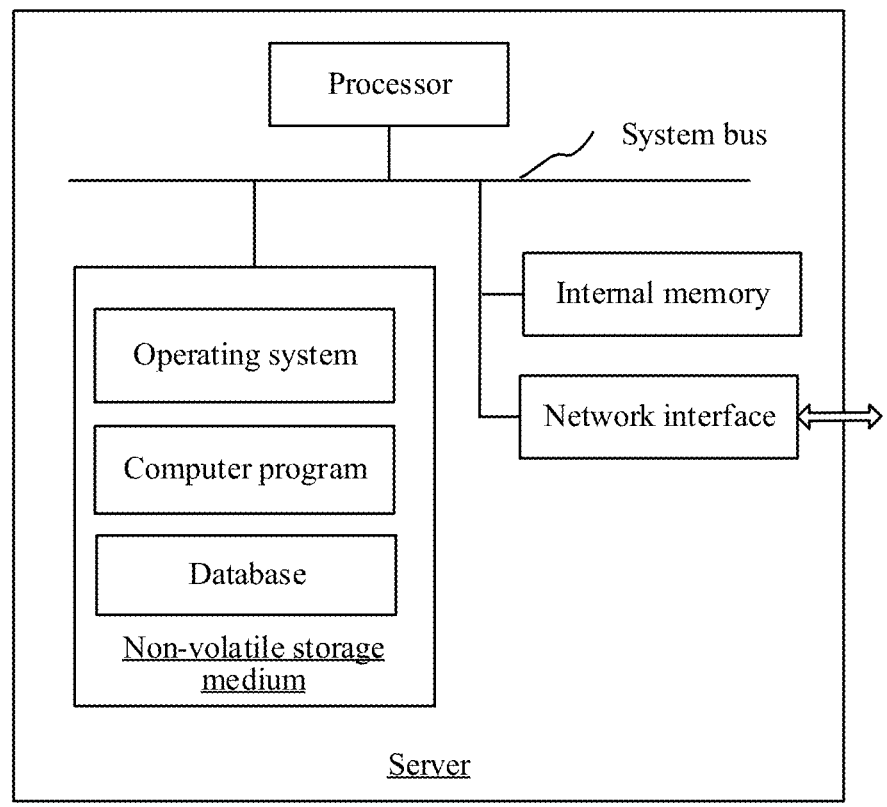
FIG. 13 is a schematic structural diagram of a server according to an embodiment of the present disclosure.

The computer device may be provided as a server shown in FIG. 13. As shown in FIG. 13, the server includes a processor, a memory, a network interface, and a database that are connected by using a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and computer program in the non-volatile storage medium. The database of the computer device is configured to store image data. The network interface of the computer device is configured to communicate with an external terminal through a network connection. The computer program is executed by the processor to implement an image segmentation method or an image segmentation model training method.

Figure 14:
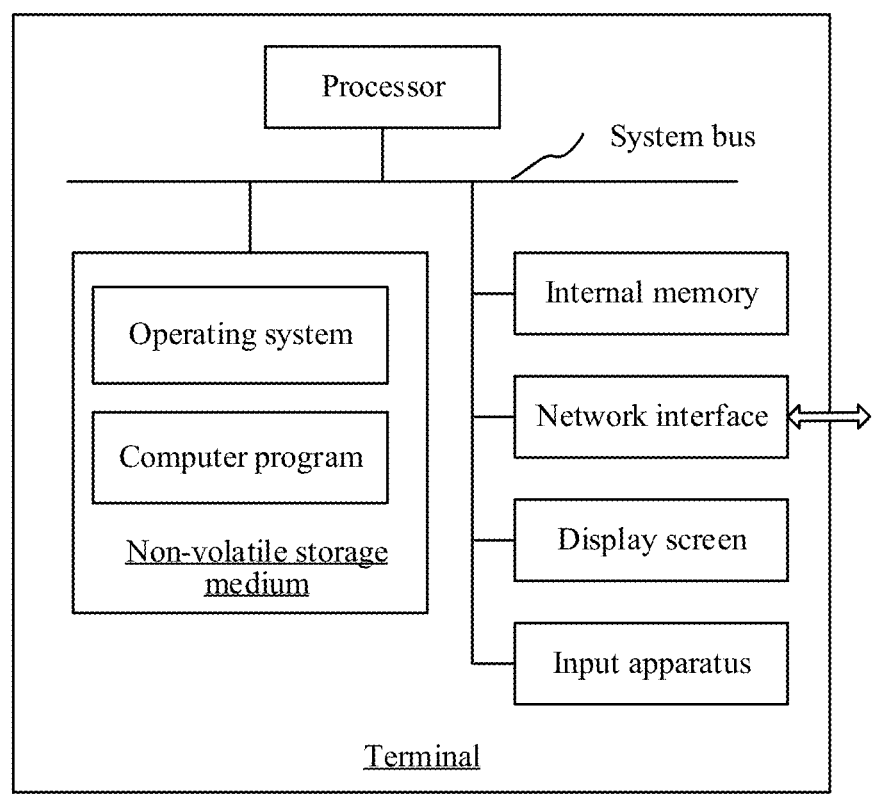
FIG. 14 is a schematic structural diagram of a terminal according to an embodiment of the present disclosure.

The computer device may be provided as a terminal shown in FIG. 14. As shown in FIG. 14, the terminal includes a processor, a memory, a network interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and computer program in the non-volatile storage medium. The network interface of the computer device is configured to communicate with an external terminal through a network connection. The computer program is executed by the processor to implement an image segmentation method or an image segmentation model training method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, a touchpad, a mouse, or the like.

A person skilled in the art may understand that, in the structures shown in FIG. 13 and FIG. 14, only block diagrams of partial structures related to a solution in the present disclosure are shown, and the structures do not constitute a limitation to the server and the terminal to which the solution in the present disclosure is applied. Specifically, the server and the terminal may include more components or fewer components than those shown in the figure, or some components may be combined, or a different component deployment may be used.

In an embodiment, the image segmentation apparatus provided in the present disclosure may be implemented in the form of computer-readable instructions, and the computer-readable instructions may be run on the server shown in FIG. 13, or on the terminal shown in FIG. 14. The memory of the server or the terminal may store program modules forming the image segmentation apparatus, such as the obtaining module 1001, the training module 1002, and the segmentation module 1003. The computer-readable instructions formed by the program modules cause the processor to perform steps in the image segmentation method or the image segmentation model training method in the embodiments of the present disclosure described in this specification.

An embodiment of the present disclosure provides a computer-readable storage medium, storing computer-readable instructions, the computer-readable instructions being loaded and executed by a processor to perform operations performed in the image segmentation method or the image segmentation model training method according to the foregoing embodiments.

A person of ordinary skill in the art may understand that all or some of the processes in the method of the foregoing embodiments may be implemented by a computer program instructing related hardware. The program may be stored in a non-volatile computer-readable storage medium, and the program, when executed, may include the processes of the foregoing method embodiments. Any reference to a memory, storage, database, or another medium used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. As an illustration instead of a limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

A person skilled in the art may figure out another implementation solution of the present disclosure after considering the specification and practicing the present disclosure that is disclosed herein. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure. The specification and the embodiments are considered as merely exemplary, and the real scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. An image segmentation method for a computer device, comprising:
   obtaining a plurality of sample images;
   calling an initial model to input the plurality of sample images into the initial model, and to train the initial model based on the plurality of sample images to obtain an image segmentation model;
   based on the initial model, determining a number of image segmentation modules according to a number of types of pixels of the plurality of sample images, wherein different image segmentation modules are used for segmenting different regions of an image; and
   calling the image segmentation model in response to obtaining a first image to be segmented, and segmenting the first image by using the image segmentation model based on a plurality of image segmentation modules that are sequentially arranged, to output a second image, comprising:
      for two adjacently arranged image segmentation modules of the plurality of image segmentation modules, segmenting, based on a first image segmentation module arranged ahead of the two adjacent image segmentation modules, a third image to obtain a first segmentation result;
      obtaining a fourth image by cropping the third image based on the first segmentation result:
      segmenting, based on a second image segmentation module arranged behind of the two adjacent image segmentation modules, the fourth image to obtain a second segmentation result;
   wherein:
   the plurality of image segmentation modules respectively correspond to one type of pixels; and
   during obtaining of a segmentation error of a segmentation result of each image segmentation module using a loss function in a training process of the initial model, a weight of a type in the loss function corresponding to the image segmentation module is greater than a weight of another type in the loss function.

2. The method according to claim 1, wherein the determining a number of image segmentation modules according to a number of types of pixels of the plurality of sample images comprises:
   using a number of types of foreground pixels of the plurality of sample images as the number of the image segmentation modules in the initial model.

3. The method according to claim 1, wherein:
   each sample image carries a label, and the label is used for indicating a target segmentation result of the sample image; and
   before the determining a number of image segmentation modules according to a number of types of pixels of the plurality of sample images, the method further comprises:
   analyzing labels of the plurality of sample images, to obtain the number of types of pixels of the plurality of sample images.

4. The method according to claim 1, wherein
   the fourth image comprises pixels of a first type indicated by the first segmentation result, and the first type is a type corresponding to the first image segmentation module.

5. The method according to claim 1, further comprising:
   obtaining, in the training process of the initial model, a pixel ratio between adjacent target regions of a plurality of target regions corresponding to the plurality of sample images, the target region being a region in which pixels of a target type in the plurality of sample images are located; and
   cropping, when each of the plurality of image segmentation modules crops an image, the image according to a magnitude relationship between the pixel ratio between adjacent target regions of the plurality of target regions and a target value.

6. The method according to claim 5, further comprising:
   obtaining, in the training process of the initial model, connected domain ranges of the plurality of target regions corresponding to the plurality of sample images; and
   cropping, when each of the plurality of image segmentation modules crops an image, the image according to a magnitude relationship between the pixel ratio between adjacent target regions of the plurality of target regions and a target value and the connected domain ranges of the plurality of target regions.

7. The method according to claim 6, wherein the cropping, when each of the plurality of image segmentation modules crops an image, the image according to a magnitude relationship between the pixel ratio between adjacent target regions of the plurality of target regions and a target value and the connected domain ranges of the plurality of target regions comprises:
   for the first image segmentation module, cropping the third image according to a magnitude relationship between a pixel ratio of a first target region to a second target region and the target value, and a connected domain range of the first target region or the second target region, the first target region being a region in which pixels of a first type corresponding to the first image segmentation module are located, and the second target region being a region in which pixels of a second type corresponding to the second image segmentation module are located.

8. The method according to claim 7, wherein the cropping the third image according to a magnitude relationship between a pixel ratio of a first target region to a second target region and the target value, and a connected domain range of the first target region or the second target region comprises:
cropping the third image based on the connected domain range of the first target region when the pixel ratio of the first target region to the second target region is less than the target value, a size of a cropped fourth image being obtained based on the connected domain range of the first target region and a first coefficient; and
cropping the third image based on the connected domain range of the second target region when the pixel ratio of the first target region to the second target region is greater than or equal to the target value, the size of the cropped fourth image being obtained based on the connected domain range of the second target region and a second coefficient, and the first coefficient being less than the second coefficient.

9. The method according to claim 1, wherein:
the initial model and the image segmentation model both comprise three view sub-models, and the three view sub-models are respectively used for obtaining slices of an image according to different viewing angles and segmenting the image;
the determining a number of image segmentation modules according to a number of types of pixels of the plurality of sample images comprises:
using a number of types of foreground pixels of the plurality of sample images as the number of the image segmentation modules in each view sub-model; and
the segmenting the first image by the image segmentation model based on a plurality of image segmentation modules, to output a second image comprises:
obtaining, by the computer device by using the three view sub-models, at least one slice of the first image respectively according to corresponding viewing angles, segmenting each slice by using the plurality of image segmentation modules in the each view sub-model, and outputting the second image based on segmentation results of the three view sub-models.

10. The method according to claim 9, wherein:
a segmentation result of the each view sub-model in the three view sub-models comprises image segmentation results of the plurality of image segmentation modules; and
the outputting the second image based on segmentation results of the three view sub-models comprises:
calculating a weighted sum of the image segmentation results of the plurality of image segmentation modules of the three view sub-models based on weights corresponding to the three view sub-models and a weight corresponding to each image segmentation module in the each view sub-model, to output the second image, the weights corresponding to the three view sub-models and the weight corresponding to each image segmentation module in the each view sub-model being determined based on a cross validation manner.

11. The method according to claim 1, further comprising:
in a training process of the initial model, for each image segmentation module, obtaining, according to an image number of the plurality of sample images, image segmentation submodules corresponding to the image number as the image segmentation module, the image segmentation module comprising at least one image segmentation submodule, and different image segmentation submodules having different depths.

12. A computer device, comprising:
a memory storing computer program instructions; and
a processor coupled to the memory and, when executing the computer program instructions, configured to perform:
obtaining a plurality of sample images;
calling an initial model to input the plurality of sample images into the initial model, and to train the initial model based on the plurality of sample images to obtain an image segmentation model;
based on the initial model, determining a number of image segmentation modules according to a number of types of pixels of the plurality of sample images, wherein different image segmentation modules are used for segmenting different regions of an image; and
calling the image segmentation model in response to obtaining a first image to be segmented, and segmenting the first image by using the image segmentation model based on a plurality of image segmentation modules that are sequentially arranged, to output a second image, comprising:
for two adjacently arranged image segmentation modules of the plurality of image segmentation modules, segmenting, based on a first image segmentation module arranged ahead of the two adjacent image segmentation modules, a third image to obtain a first segmentation result;
obtaining a fourth image by cropping the third image based on the first segmentation result;
segmenting, based on a second image segmentation module arranged behind of the two adjacent image segmentation modules, the fourth image to obtain a second segmentation result.
wherein:
the plurality of image segmentation modules respectively correspond to one type of pixels; and
during obtaining of a segmentation error of a segmentation result of each image segmentation module using a loss function in a training process of the initial model, a weight of a type in the loss function corresponding to the image segmentation module is greater than a weight of another type in the loss function.

13. The computer device according to claim 12, wherein the determining a number of image segmentation modules according to a number of types of pixels of the plurality of sample images comprises:
using a number of types of foreground pixels of the plurality of sample images as the number of the image segmentation modules in the initial model.

14. The computer device according to claim 12, wherein:
each sample image carries a label, and the label is used for indicating a target segmentation result of the sample image; and
before the determining a number of image segmentation modules according to a number of types of pixels of the plurality of sample images, the processor is further configured to perform:
analyzing labels of the plurality of sample images, to obtain the number of types of pixels of the plurality of sample images.

15. A non-transitory computer-readable storage medium storing computer program instructions executable by at least one processor to perform:
- obtaining a plurality of sample images;
- calling an initial model to input the plurality of sample images into the initial model, and to train the initial model based on the plurality of sample images to obtain an image segmentation model;
- based on the initial model, determining a number of image segmentation modules according to a number of types of pixels of the plurality of sample images, wherein different image segmentation modules are used for segmenting different regions of an image; and
- calling the image segmentation model in response to obtaining a first image to be segmented, and segmenting the first image by using the image segmentation model based on a plurality of image segmentation modules that are sequentially arranged, to output a second image, comprising:
  - for two adjacently arranged image segmentation modules of the plurality of image segmentation modules, segmenting, based on a first image segmentation module arranged ahead of the two adjacent image segmentation modules, a third image to obtain a first segmentation result;
  - obtaining a fourth image by cropping the third image based on the first segmentation result;
  - segmenting, based on a second image segmentation module arranged behind of the two adjacent image segmentation modules, the fourth image to obtain a second segmentation result.

wherein:
- the plurality of image segmentation modules respectively correspond to one type of pixels; and
- during obtaining of a segmentation error of a segmentation result of each image segmentation module using a loss function in a training process of the initial model, a weight of a type in the loss function corresponding to the image segmentation module is greater than a weight of another type in the loss function.

16. The non-transitory computer-readable storage medium according to claim 15, wherein the determining a number of image segmentation modules according to a number of types of pixels of the plurality of sample images comprises:
- using a number of types of foreground pixels of the plurality of sample images as the number of the image segmentation modules in the initial model.

17. The non-transitory computer-readable storage medium according to claim 15, wherein:
- each sample image carries a label, and the label is used for indicating a target segmentation result of the sample image; and
- before the determining a number of image segmentation modules according to a number of types of pixels of the plurality of sample images, the computer programs are further executable by the processor to perform:
  - analyzing labels of the plurality of sample images, to obtain the number of types of pixels of the plurality of sample images.

18. The non-transitory computer-readable storage medium according to claim 15, wherein the computer program instructions further cause the at least one processor to perform:
- obtaining, in the training process of the initial model, a pixel ratio between adjacent target regions of a plurality of target regions corresponding to the plurality of sample images, the target region being a region in which pixels of a target type in the plurality of sample images are located; and
- cropping, when each of the plurality of image segmentation modules crops an image, the image according to a magnitude relationship between the pixel ratio between adjacent target regions of the plurality of target regions and a target value.

19. The non-transitory computer-readable storage medium according to claim 18, wherein the computer program instructions further cause the at least one processor to perform:
- obtaining, in the training process of the initial model, connected domain ranges of the plurality of target regions corresponding to the plurality of sample images; and
- cropping, when each of the plurality of image segmentation modules crops an image, the image according to a magnitude relationship between the pixel ratio between adjacent target regions of the plurality of target regions and a target value and the connected domain ranges of the plurality of target regions.

20. The non-transitory computer-readable storage medium according to claim 19, wherein the cropping, when each of the plurality of image segmentation modules crops an image, the image according to a magnitude relationship between the pixel ratio between adjacent target regions of the plurality of target regions and a target value and the connected domain ranges of the plurality of target regions comprises:
- for the first image segmentation module, cropping the third image according to a magnitude relationship between a pixel ratio of a first target region to a second target region and the target value, and a connected domain range of the first target region or the second target region, the first target region being a region in which pixels of a first type corresponding to the first image segmentation module are located, and the second target region being a region in which pixels of a second type corresponding to the second image segmentation module are located.

\* \* \* \* \*